US012629574B1

(12) United States Patent
Hobbs et al.

(10) Patent No.: US 12,629,574 B1
(45) Date of Patent: May 19, 2026

(54) ADDITIVE MANUFACTURING FOR GOLF CLUB SHAFT

(71) Applicant: Cobra Golf Incorporated, Carlsbad, CA (US)

(72) Inventors: Bryce W. Hobbs, Carlsbad, CA (US); Ryan L. Roach, Encinitas, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 936 days.

(21) Appl. No.: 17/882,996

(22) Filed: Aug. 8, 2022

Related U.S. Application Data

(63) Continuation-in-part of application No. 17/719,013, filed on Apr. 12, 2022, now Pat. No. 12,246,228, which is a continuation of application No. 16/815,303, filed on Mar. 11, 2020, now Pat. No. 11,298,600.

(60) Provisional application No. 62/821,549, filed on Mar. 21, 2019.

(51) Int. Cl.
| | |
|---|---|
| *A63B 53/10* | (2015.01) |
| *A63B 102/32* | (2015.01) |
| *B33Y 80/00* | (2015.01) |

(52) U.S. Cl.
CPC .......... *A63B 53/10* (2013.01); *A63B 2102/32* (2015.10); *A63B 2209/02* (2013.01); *B33Y 80/00* (2014.12)

(58) Field of Classification Search
CPC ................ A63B 53/10; A63B 2102/32; A63B 2209/02; B33Y 80/00
See application file for complete search history.

(56) References Cited

U.S. PATENT DOCUMENTS

| | | | |
|---|---|---|---|
| 11,779,821 B2 * | 10/2023 | Davis ...................... | A43B 1/00 |
| | | | 2/425 |
| 2014/0274458 A1 * | 9/2014 | Kronenberg ........... | A63B 60/46 |
| | | | 700/106 |
| 2016/0125494 A1 * | 5/2016 | Soracco ................. | A63B 60/42 |
| | | | 705/26.5 |
| 2017/0185070 A1 * | 6/2017 | Kronenberg .......... | B22F 3/1115 |
| 2025/0026433 A1 * | 1/2025 | Vehlies .................. | B33Y 80/00 |
| 2025/0222647 A1 | 7/2025 | Johnston et al. | |

FOREIGN PATENT DOCUMENTS

| | | | | |
|---|---|---|---|---|
| KR | 20190089186 A * | 7/2019 | ............. | A63B 53/14 |
| WO | WO-9624413 A1 * | 8/1996 | ............. | A63B 60/10 |

* cited by examiner

*Primary Examiner* — Jeffrey S Vanderveen
(74) *Attorney, Agent, or Firm* — Quarles & Brady LLP

(57) ABSTRACT

A golf club shaft consists of a grip and a 3D printed body. The 3D printed body defines an outer sidewall, and an axis that extends centrally through a top and bottom of the golf club shaft, with an inner surface of the 3D printed body defining a first side and a second side that is located opposite the first side. An uninterrupted volume extends between the first side and the second side along an entire length of the 3D printed body.

19 Claims, 27 Drawing Sheets

1100

1108

A

1102

1104

1132

1114

43

43

1106

1116

1110

1100

1118

1102

1106

1114

1116

1132

1110

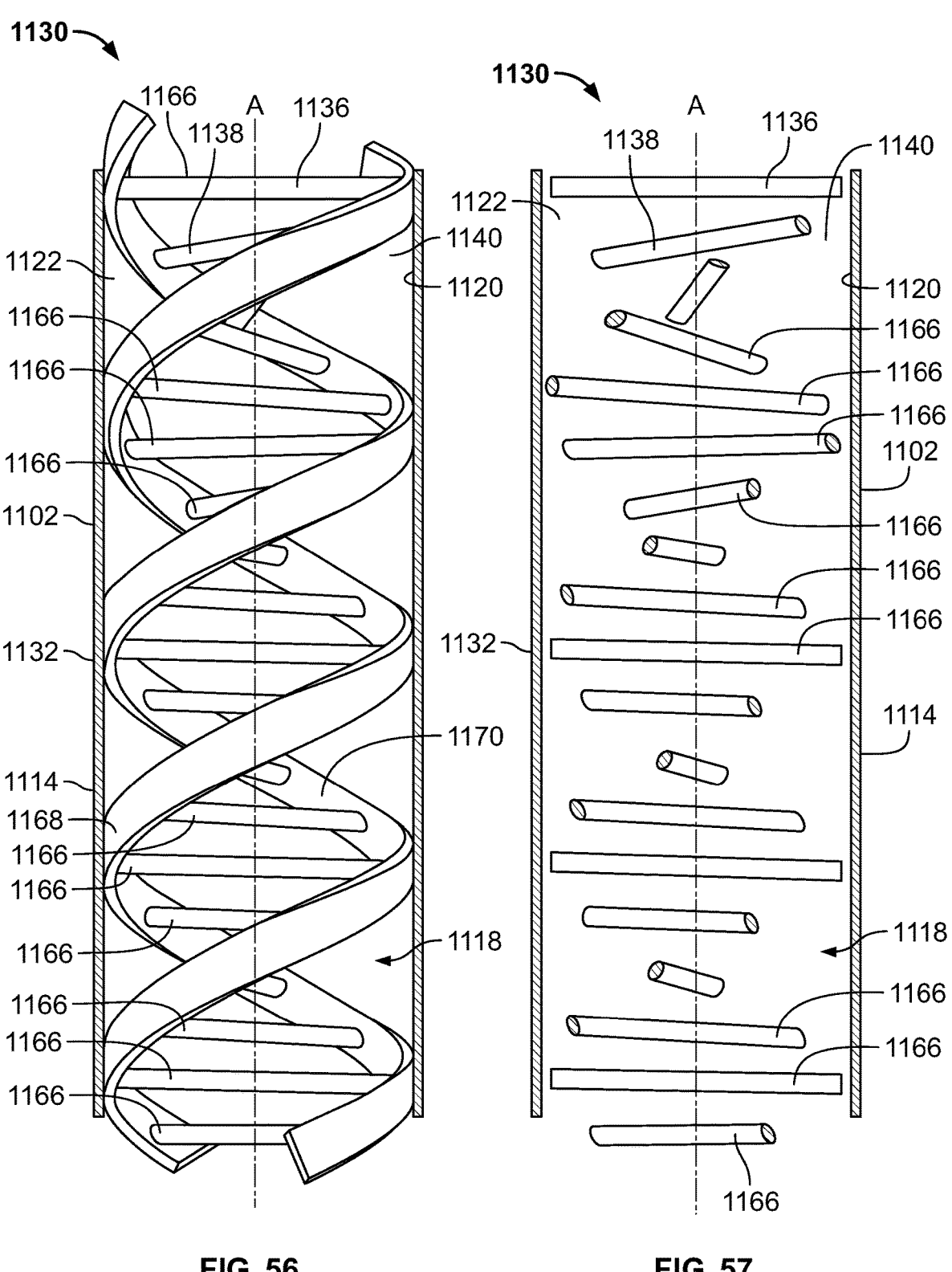
FIG. 56                    FIG. 57

ADDITIVE MANUFACTURING FOR GOLF CLUB SHAFT

RELATED APPLICATIONS

The present application is a continuation-in-part application of and claims priority to U.S. application Ser. No. 17/719,013, filed on Apr. 12, 2022, which claims priority to application Ser. No. 16/815,303, filed on Mar. 11, 2020, now U.S. Pat. No. 11,298,600, which claims priority to U.S. Provisional Application Ser. No. 62/821,549 filed on Mar. 21, 2019, each of which being incorporated by reference in their entirety herein.

TECHNICAL FIELD

The invention relates to golf clubs.

BACKGROUND

Golfers spend a lot of time and money to obtain golf clubs with the best technology to help them make shots that are long and accurate. Golfers will spend hours in the pro shop and significant amounts of money to pick the driver head that adds a few yards to their drive, or for specialty forged irons that will give them even a small score improvement. Interestingly, almost all golf clubs have one trait in common in that they only have one significantly moving part, the golf club shaft. Save for some subtle deflections in a club head's ball-striking face, the only part of a golf club that really moves, bends, and deforms during regular play is the shaft.

Shafts for golf clubs may be made out of steel or graphite. Steel shafts are rolled and cut from a thin plate, then welded. Graphite/carbon shafts are rolled, then cured. Shafts made by those methods have limits to their strength and existing manufacturing techniques do not give designers many options for fine control over shaft flexibility, or the range of movements that a shaft will exhibit during regular play. In fact, given that the shaft is the moving part of a golf club that moves the most dramatically during play, it is somewhat surprising and unfortunate that there are such a limited range of approaches to shaft design and manufacturing available to club makers today.

Single and double bend putter shafts are used for some putter models with a shaft-over-hosel mating configuration, i.e., models that do not have plumber necks. Shafts that are used with plumber neck hosels can be made from graphite or steel because the shaft is manufactured to be linear and straight along the shaft axis. Some known single and double bend putter shafts are made with multiple materials, and include a carbon fiber component along the straight shaft axis that is mated to a steel portion where the shaft bends. However, making a bent shaft component out of carbon fiber or graphite using traditional manufacturing techniques is difficult since the material must be rolled along a mandrel with a linear central axis. Attempting to roll carbon fiber around a bent mandrel is extremely difficult for both the rolling as well as the mandrel extraction. As a result, traditional bent putter shafts must be made from steel that can be manufactured into a linear shaft, then bent to a defined specification.

SUMMARY

The disclosure provides methods of making golf club shafts that include a lattice structure, and golf club shafts that are at least partially 3D printed. Methods herein include designing a shaft in a computer-assisted drawing (CAD) program, e.g., with a lattice structure at any point therein. Parameters like dimensions and material for an outer layer or dimensions, locations, material, and pore structure for a lattice structure inside of the outer layer can be adjusted in the CAD model. The designed shaft may be created using a large-format 3D printer. Where unlike materials are printed together (e.g., a first material embedded within another, a first material abutting another, or a seamless transition from the first material to the second material), the large-format 3D printer can operate to change input material to form the materials together.

Using 3D printing in the design and manufacture of golf club shafts allows a designer to limit and increase the range of possible motions that the shaft exhibits during regular use. Using methods of the disclosure, a designer has fine-grained control over shaft stiffness and flexibility and can, in fact, control just how stiff versus flexible a shaft is at each cm along its length. Preferred embodiments of the disclosure include methods of making golf club shafts that include a lattice structure, in which the shafts may be made by methods that include 3D printing or similar additive manufacturing methods. For example, a shaft may include a substantially tubular outer shell (e.g., of nylon, carbon fiber, or acrylonitrile butadiene styrene) and may also include a lattice portion within the outer shell, along part or all of the shaft length. The lattice portion may be a 3D printed open-work or porous structure also of a material such as nylon or acrylonitrile butadiene styrene. All or parts of the shaft may be made using an additive manufacturing process such as fused deposition modeling (FDM) and any part of the shaft, such as the outer shell, may include carbon threads for added stiffness. Thus, the disclosure provides materials and methods for manufacturing golf shafts that allow for lattice structure to be created in the interior of the shaft.

In certain aspects, the disclosure provides a golf club shaft. The shaft includes an extended body having a tip end and an opposed butt end, wherein a portion of the shaft is made by additive manufacturing. The portion of the shaft made by additive manufacturing may include a lattice structure within an interior of the shaft. The extended body may include an outer layer having a substantially tubular shape. Preferably, a portion of the shaft made by additive manufacturing comprises a lattice structure inside of the outer layer.

In some embodiments, the outer layer and the interior lattice structure are 3D printed together. The outer layer may include nylon or acrylonitrile butadiene styrene. The portion of the shaft made by additive manufacturing may include a 3D-printed lattice structure disposed within the outer layer. In certain embodiments, the outer layer comprises a perimeter of carbon fiber that has been printed and bonded to the 3D-printed lattice structure during the additive manufacturing. The 3D-printed lattice may include a polymer such as nylon.

In certain embodiments, the extended body includes a 3D-printed carbon fiber tube, and the shaft also includes a 3D-printed nylon lattice disposed within at least a portion of the carbon fiber tube. The portion of the shaft that is made by additive manufacturing may include an outer tubular member defining a perimeter of the shaft, and the outer tubular member may be made by fused deposition modeling (FDM). The outer tubular member may include carbon threads. In particular, methods such as FDM or fused filament fabrication (FFF) and other 3D printing methods allow for the outer tubular member to include the carbon threads disposed throughout a matrix of nylon or acrylonitrile butadiene styrene.

In some embodiments, the portion of the shaft that is made by additive manufacturing includes a lattice core disposed within, and along at least a portion of, the extended body. The lattice core may define a substantially porous structure and may be formed by fused deposition modeling (FDM) or other 3D printing methods.

In one aspect, an example golf club shaft is disclosed that includes an extended body and a core. The core is disposed in the extended body.

In another aspect, a golf club shaft is disclosed that includes an extended body and a lattice structure. The lattice structure is bonded to an interior of the extended body.

In another aspect, a golf club shaft is disclosed that includes an extended body and a core. The extended body includes a carbon fiber layer bonded to a polymer layer. The core is disposed in the extended body.

In some aspects, a method for printing a golf club shaft includes steps of receiving a model of the golf club shaft, providing an additive manufacturing system, and manufacturing the model using the additive manufacturing system. The golf club shaft includes an extended body defining a longitudinal axis that extends centrally through a top and bottom of the golf club shaft, and through which a plane extends. The plane defines a first side of the extended body and a second side of the extended body. Additionally, a core is disposed in the extended body and comprises a lattice structure integrally formed with the extended body. The lattice structure extends from an inner surface of the extended body along the first side thereof to the inner surface along the second side thereof. At least a portion of the lattice structure extends through the longitudinal axis.

In some embodiments, a first gap is formed between the top of the golf club shaft and a top of the lattice structure and a second gap is formed between the bottom of the golf club shaft and a bottom of the lattice structure. In some embodiments, the top of the golf club shaft is coextensive with a top of the lattice structure. In some embodiments, the bottom of the golf club shaft is coextensive with a bottom of the lattice structure. In some embodiments, the lattice structure comprises a hub and a plurality of spokes that extend between the hub and the extended body. In some embodiments, the lattice structure has a plurality of segments that extend from the inner surface along the first side of the extended body to the inner surface along the second side of the extended body. In some embodiments, the lattice structure comprises a plurality of trellises.

In some aspects, a method for printing a golf club shaft includes the steps of receiving a model of the golf club shaft, providing an additive manufacturing system, and manufacturing the model using the additive manufacturing system. The golf club shaft includes an extended body defining a longitudinal axis that extends centrally through a top and bottom of the golf club shaft, and through which a plane extends. The plane defines a first side of the extended body and a second side of the extended body. Additionally, a core is disposed in the extended body and comprises a lattice structure integrally formed with the extended body. The lattice structure comprises a plurality of segments that extend from an inner surface of the extended body along the first side thereof to the inner surface along the second side thereof.

In some embodiments, a first gap is formed between the top of the golf club shaft and a top of the lattice structure and a second gap is formed between the bottom of the golf club shaft and a bottom of the lattice structure. In some embodiments, the top of the golf club shaft is coextensive with a top of the lattice structure. In some embodiments, the bottom of the golf club shaft is coextensive with a bottom of the lattice structure. In some embodiments, the lattice structure comprises a hub and a plurality of spokes that extend between the hub and the extended body. In some embodiments, the lattice structure comprises a plurality of outer passages formed by a plurality of inner rings and a plurality of ribs. In some embodiments, the lattice structure comprises an inner passage that is in communication with a plurality of outer passages.

In some aspects, a method for printing a golf club shaft includes the steps of receiving a model of the golf club shaft, providing an additive manufacturing system, and manufacturing the model using the additive manufacturing system. The golf club shaft includes an extended body and a lattice structure integrally formed with the extended body.

In some embodiments, a first gap is formed between a top of the golf club shaft and a top of the lattice structure and a second gap is formed between a bottom of the golf club shaft and a bottom of the lattice structure. In some embodiments, a top of the golf club shaft is coextensive with a top of the lattice structure. In some embodiments, a bottom of the golf club shaft is coextensive with a bottom of the lattice structure. In some embodiments, the lattice structure comprises a plurality of branches that are interconnected to one another to form a plurality of inner rings. In some embodiments, the lattice structure comprises a hub and a plurality of spokes extending between the hub and the extended body.

In some embodiments, a golf club shaft consists of a grip and a 3D printed body defining an outer sidewall, and an axis that extends centrally through a top and bottom of the golf club shaft, with an inner surface of the 3D printed body defining a first side and a second side that is located opposite the first side. An uninterrupted volume extends between the first side and the second side along an entire length of the 3D printed body. In some embodiments, the 3D printed body includes a first lattice structure that extends from the first side to the second side. In some embodiments, the 3D printed body includes a second lattice structure that extends from a third side to a fourth side of the 3D printed body. In some embodiments the first lattice structure and the second lattice structure are orthogonally offset from one another. In some embodiments, the first lattice structure and the second lattice structure are offset circumferentially about the axis by between 5° and 45°. In some embodiments, the first lattice structure and the second lattice structure are among a plurality of segments that form a helical structure within the extended body. In some embodiments, the 3D printed body defines a lower portion and an upper portion, and the lower portion includes at least one bent region.

In some embodiments, a portion of a golf club shaft consists of a 3D printed body defining a bent region and an axis that extends centrally through a top and bottom of the golf club shaft, with an inner surface of the 3D printed body defining a first side and a second side that is located opposite the first side. In some embodiments, the 3D printed body is a lower portion of the golf club shaft, and the 3D printed body is configured to be coupled with an upper portion of the golf club shaft. In some embodiments, the 3D printed body includes at least one lattice structure extending from the first side to the second side thereof. In some embodiments, the 3D printed body includes an inset region at an upper end thereof. In some embodiments, the inset region is configured to be coupled with an upper portion of the golf club shaft. In some embodiments, the at least one lattice structure includes a first lattice structure and a second lattice structure that each extend through the axis. In some embodiments, the first lattice structure and the second lattice structure orthogonally intersect. In some embodiments, the first lattice structure and the second lattice structure extend from a bottom end of the extended body to an upper end of the extended body.

In some embodiments, a golf club shaft consists of a grip and a 3D printed body defining a bent region and an axis that extends centrally through a top and bottom of the golf club shaft, with an inner surface of the extended body defining a first side and a second side that is located opposite the first side. An uninterrupted volume extends between the first side and the second side along an entire length of the 3D printed body. In some embodiments, the 3D printed body further includes a first lattice structure and a second lattice structure. In some embodiments, the first lattice structure and the second lattice structure define a helical arrangement of lattice bars. In some embodiments, the first lattice structure and the second lattice structure are offset by between 5° and 45° in a direction that is perpendicular with respect to the axis. In some embodiments, the 3D printed body consists of carbon fiber.

7
8

Figure 48:
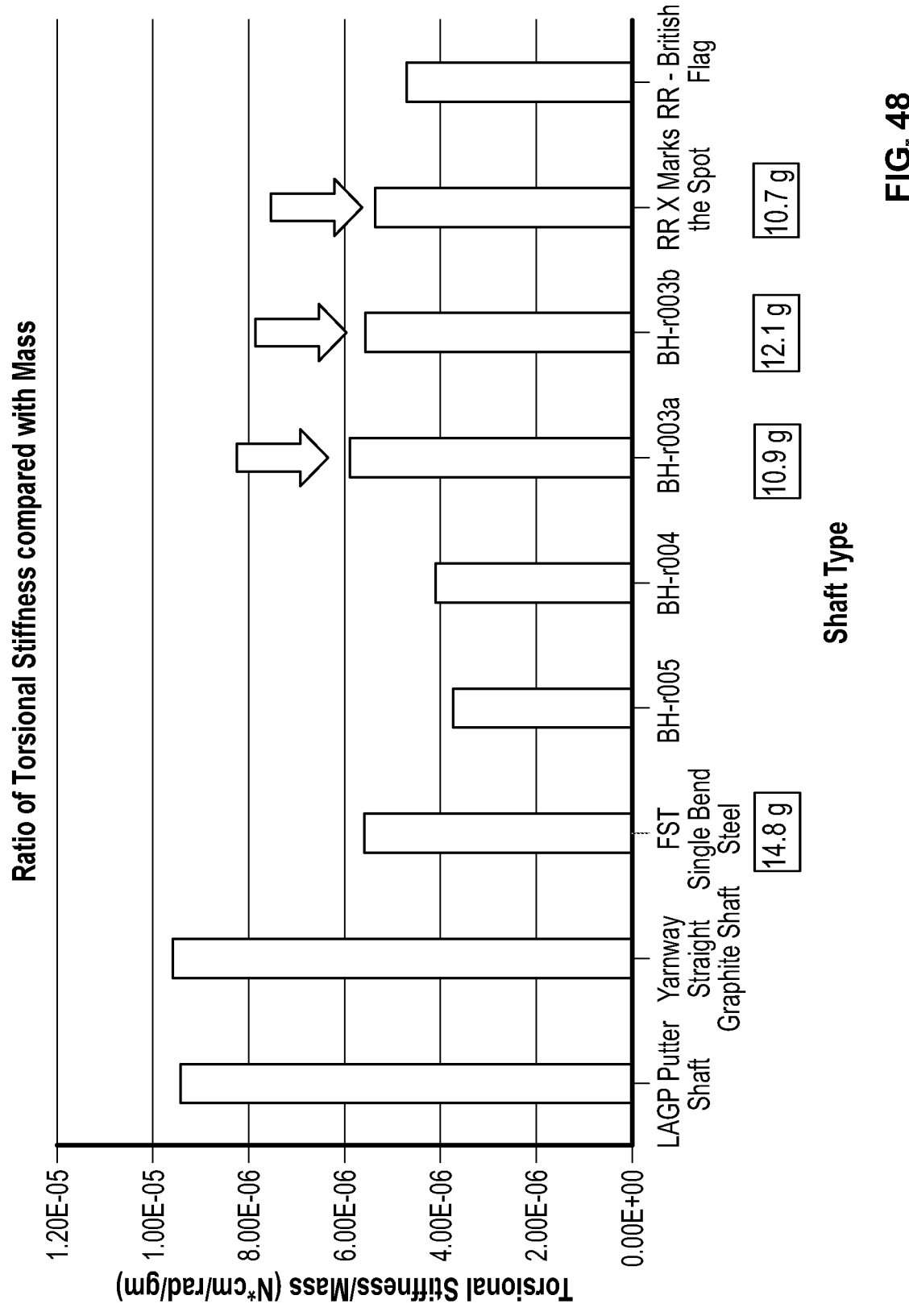
Figure 49:
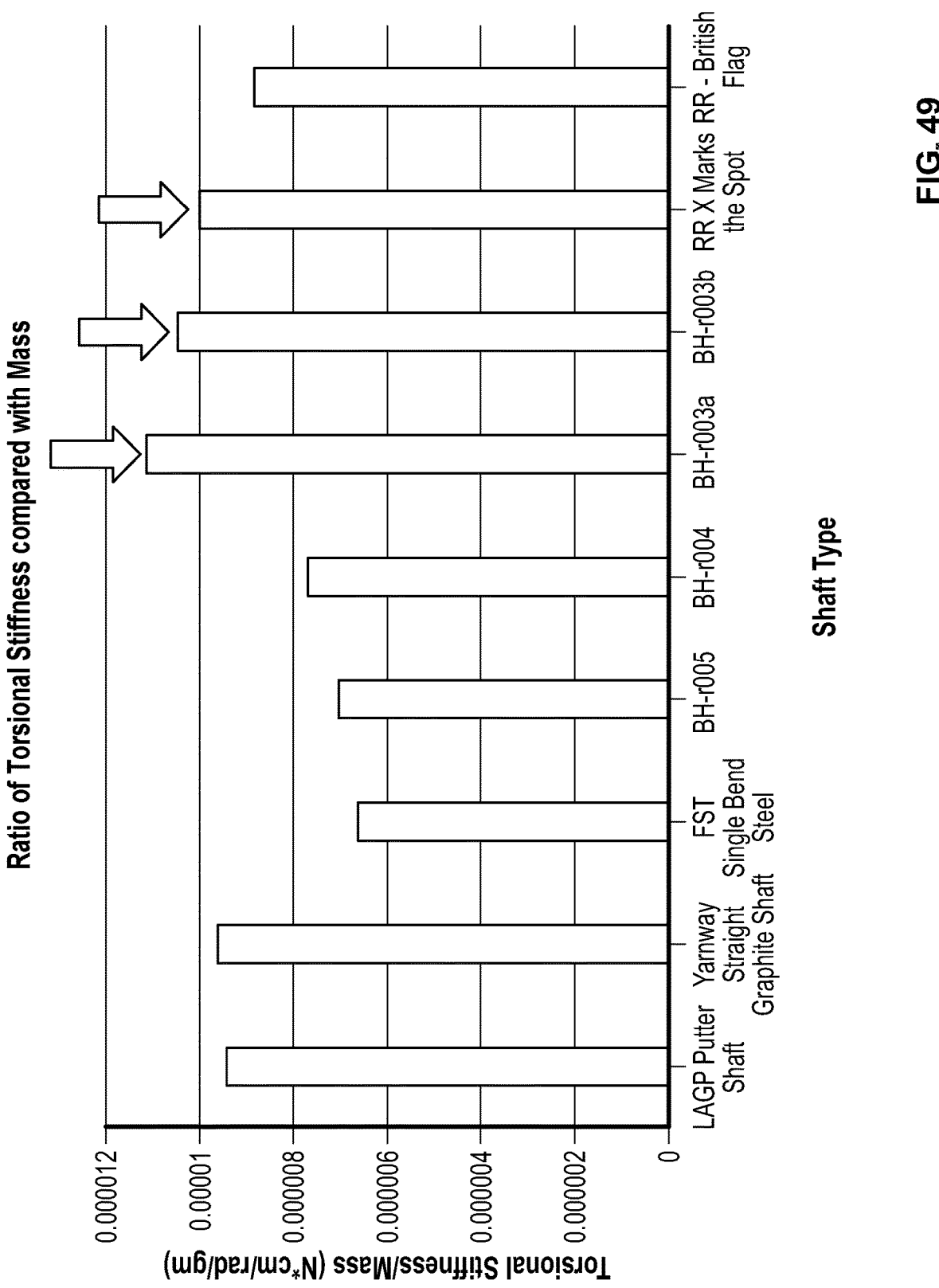
Figure 50:
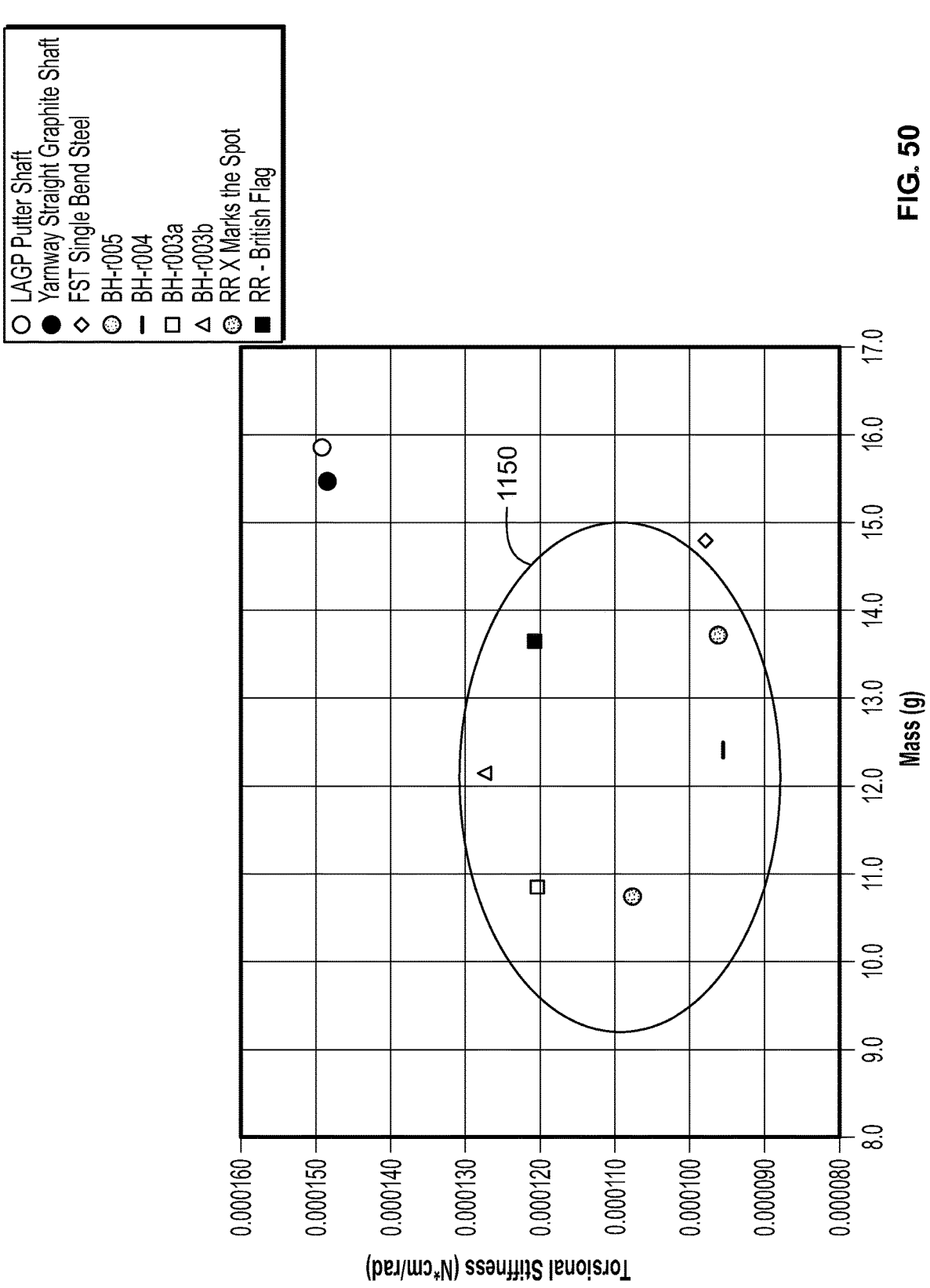
Figure 51:
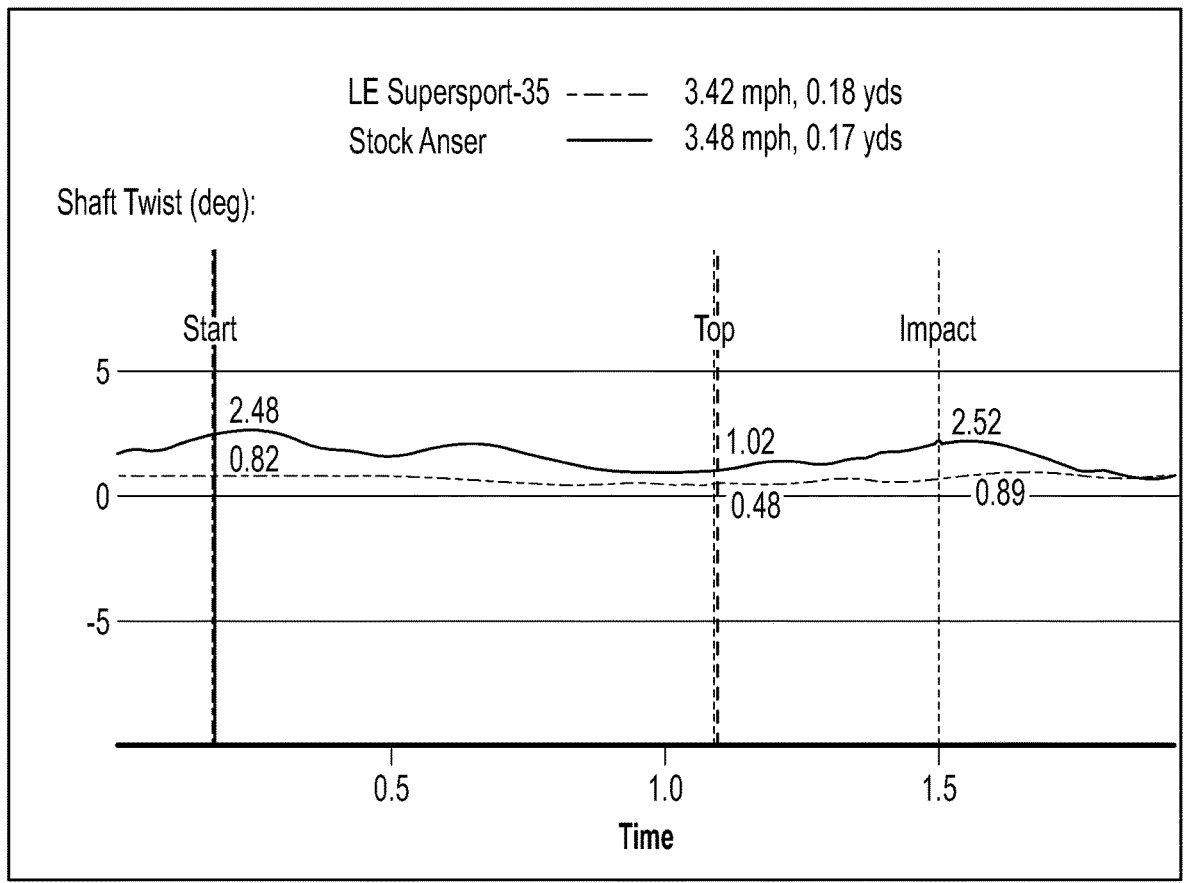
Figures 52, 53:
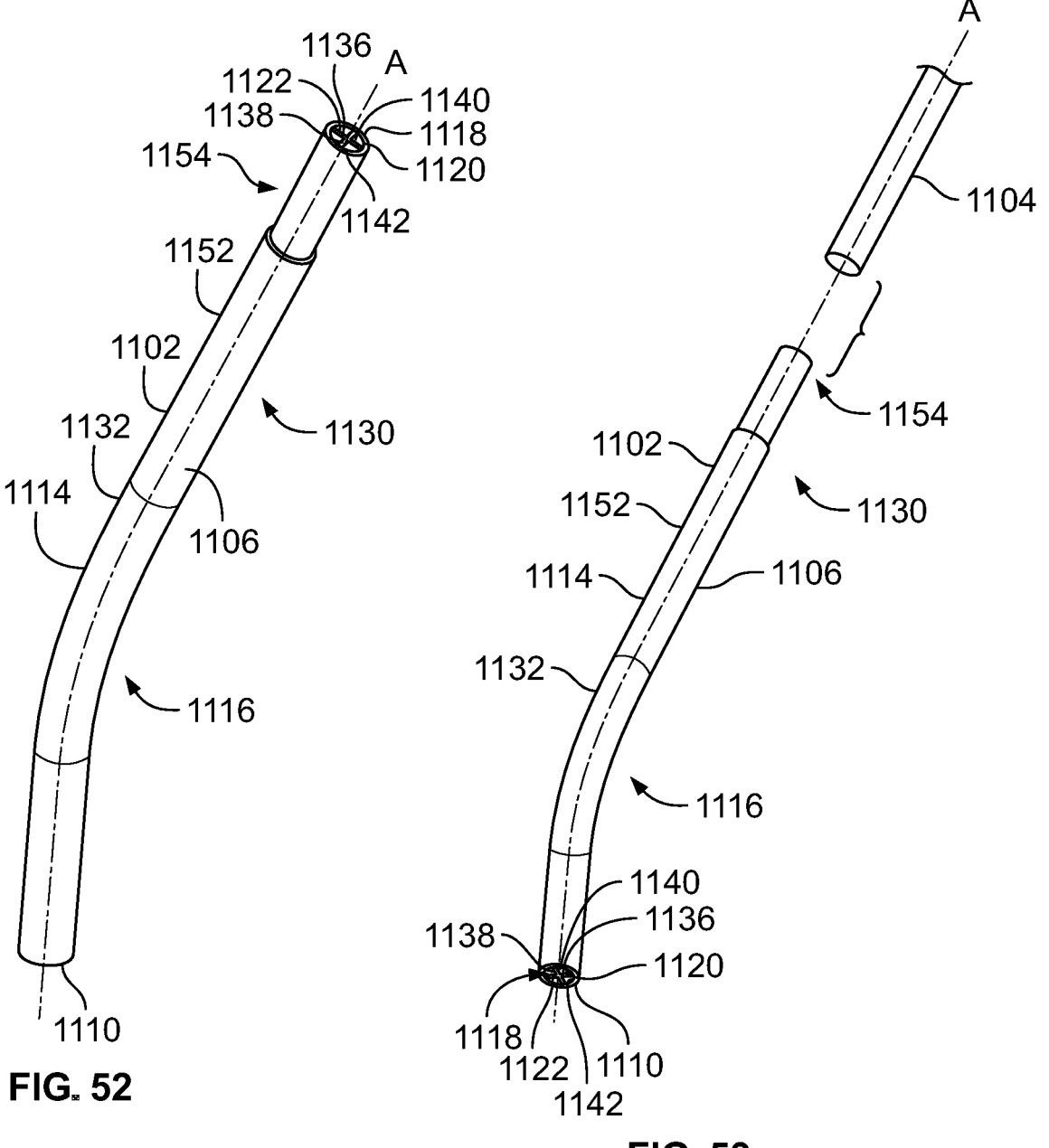
Figures 54, 55:
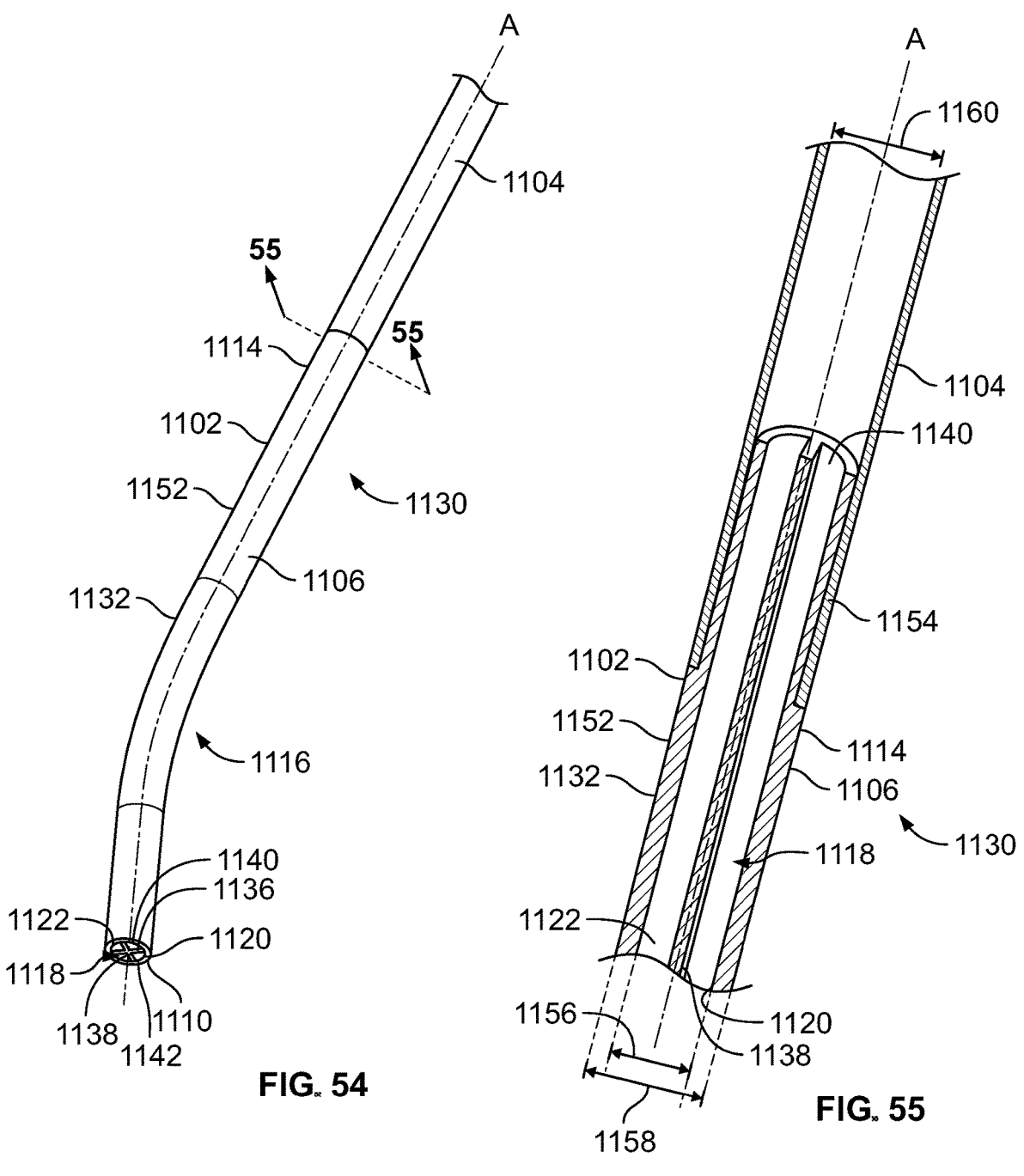

FIG. 48 is a graph illustrating various ratios of torsional stiffness compared with the mass of various golf club shafts;

FIG. 49 is another graph illustrating various ratios of torsional stiffness compared with the mass of various golf club shafts;

FIG. 50 is a plot of the ratios of FIG. 49, which illustrates a comparison of various shaft configurations comprising various materials;

FIG. 51 is a graph that illustrates a comparison of relative amounts of head rotation during a stroke for a shaft with high torsional stiffness against a shaft with lower torsional stiffness;

FIG. 52 is an isometric view of a portion of a single bend putter shaft in accordance with the present disclosure;

FIG. 53 is an isometric view of the portion of the single bend shaft of FIG. 52 being inserted into a prior art shaft;

FIG. 54 is an isometric view of the single bend shaft and prior art shaft of FIG. 53 in an assembled configuration;

FIG. 55 is a partial cross-sectional view of the assembled shaft taken through line 55-55 of FIG. 54;

FIG. 56 is a partial cross-sectional view of a golf club shaft as disclosed herein; and FIG. 57 is a partial cross-sectional view of another golf club shaft as disclosed herein.

DETAILED DESCRIPTION

Figure 1:
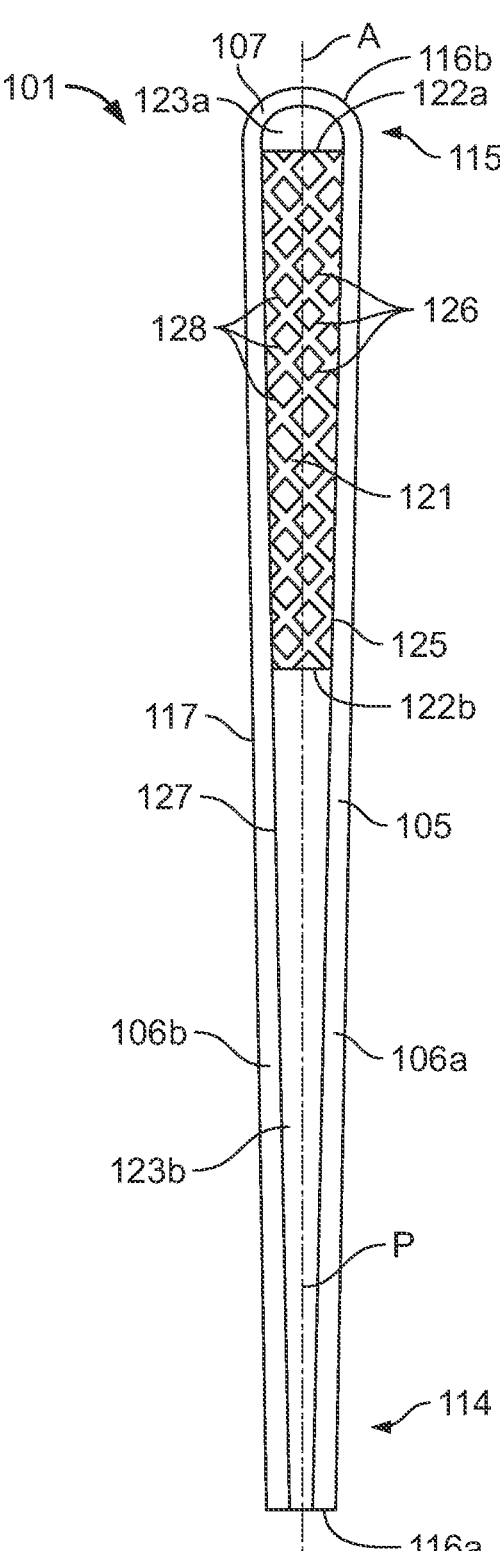
FIG. 1 is a cross-sectional schematic view of a first example golf club shaft including a first example lattice structure according to an embodiment of the present disclosure.

FIG. 1 shows a first example golf club shaft 101. The shaft 101 includes a first example extended body 105 and an end cap 107. The extended body 105 defines a longitudinal axis A through which a plane P extends (shown extending orthogonal to the cross-sectional view of FIG. 1). The plane P defines a first side 106*a* of the extended body 105 and a second side 106*b* of the extended body 105. The extended body 105 has a tip end 114 that defines a shaft bottom 116*a* and an opposed butt end 115 that defines a shaft top 116*b*. The extended body further defines an outer surface 117. In some embodiments, the tip end 114 is threaded. The shaft 101 further includes a first example lattice structure 121 that includes a top side or lattice structure top 122*a* and a bottom side or lattice structure bottom 122*b*. A first gap 123*a* is formed between the shaft top 116*b* and the lattice structure top 122*a*. A second gap 123*b* is formed between the shaft bottom 116*a* and the lattice structure bottom 122*b*. In some embodiments, at least a portion of the shaft 101 is made by additive manufacturing. In some embodiments, the portion of the shaft made by additive manufacturing is the lattice structure 121. Additive manufacturing is also often referred to as 3D-printing. Products made via additive manufacturing are often referred to as additively manufactured and/or 3D-printed. As used herein, the terms "additive manufacturing," "3D-printing," "3D printing," and the like are equivalent to one another. The lattice structure 121 is disposed within an interior cavity 124 of the extended body 105. The extended body 105 may include an outer layer 125 having a substantially tubular shape. In some embodiments, the lattice structure 121 is disposed inside the outer layer 125.

With reference to FIG. 1, in some embodiments, the outer layer 125 and the interior lattice structure 121 are 3D printed together. Thus, in some embodiments, the extended body 105 is unitary. The outer layer 125 may be formed of nylon or acrylonitrile butadiene styrene. In some embodiments, the lattice structure 121 may be 3D-printed separately from the outer layer 125. In certain embodiments, the outer layer 125 comprises a perimeter of carbon fiber that has been printed and bonded to the 3D-printed lattice structure 121 during the additive manufacturing. The 3D-printed lattice structure 121 may include a polymer such as nylon.

With reference to FIG. 1, in certain embodiments, the extended body 105 includes a 3D-printed carbon fiber tube, and the shaft 101 also includes the 3D-printed nylon lattice 121 disposed within at least a portion of the carbon fiber tube extended body 105. In some embodiments, the outer layer 125 may also be made by additive manufacturing to include an outer tubular member defining a perimeter of the shaft 101. In some embodiments, the outer layer 125 is made by fused deposition modeling (FDM). In some embodiments, the outer layer 125 includes carbon threads. In particular, methods such as FDM or fused filament fabrication (FFF) and other 3D printing methods allow for the outer layer 125 to include the carbon threads disposed throughout a matrix of nylon or acrylonitrile butadiene styrene.

With reference to FIG. 1, in some embodiments, the lattice structure 121 is a core disposed within, and along at least a portion of, the extended body 105. The lattice structure 121 includes a plurality of first segments 126 that extend from an inner surface 127 of the extended body 105 along the first side 106*a* thereof to the inner surface 127 along the second side 106*b* thereof at a downward angle with respect to the first side 106*a*. The lattice structure 121 further includes a plurality of second segments 128 that extend from the inner surface 127 of the extended body 105 along the second side 106*b* thereof to the inner surface 127 along the first side 106*a* thereof at a downward angle with respect to the second side 106*b*. The lattice structure 121 may define a substantially porous structure and may be formed by fused deposition modeling (FDM). At least some of the plurality of first segments 126 and the plurality of second segments 128 extend through the longitudinal axis A. At least some of the plurality of first segments 126 and the plurality of second segments 128 are parallel. In some embodiments, the lattice structure 121 is formed in a rectilinear pattern. It should be understood that the lattice structure 121 may be formed in any pattern.

Figure 2:
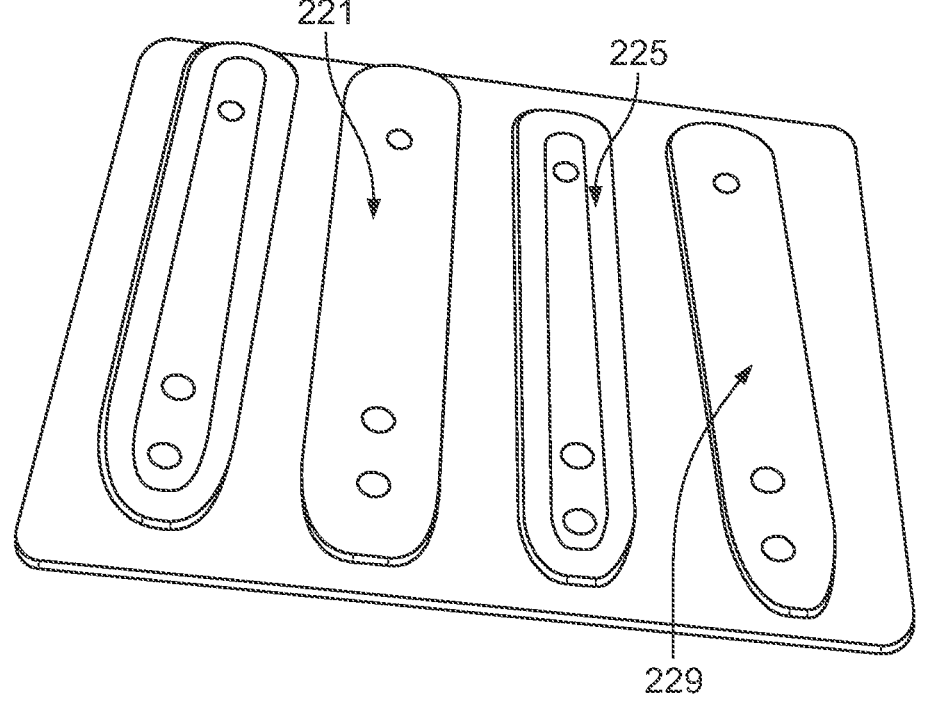
FIG. 2 illustrates segments of a golf club shaft having components that are similar to components of the shaft of FIG. 1.

FIG. 2 shows segments of known materials that illustrate what may be part of a golf club shaft 101 of the disclosure. Combining these materials allows for a shaft of a golf club as discussed hereinafter below having a stiff lattice structure core inside the shaft 101. The materials include a nylon layer 229. The nylon layer 229 may be reinforced with a perimeter of carbon fiber 225 that has been printed and bonded to the nylon layer 229 during the printing process. A structure 221 may be sandwiched or encased within the nylon layer 229 and the carbon fiber 225. With reference to FIG. 1, the shaft 101 may have such a structure along all of, or part of, its length. In some embodiments, the outer layer 125 and the interior lattice structure 121 are 3D printed together. The outer layer 125 may include nylon or acrylonitrile butadiene styrene. The portion of the shaft made by additive manufacturing may include the 3D-printed lattice structure 121 disposed within the outer layer 125. In certain embodiments, the outer layer 125 comprises a perimeter of carbon fiber 225 (shown in FIG. 2) that has been printed and bonded to the 3D-printed lattice structure 121 during the additive manufacturing. The 3D-printed lattice may include a polymer such as the nylon layer 229 (shown in FIG. 2).

Figures 3, 4, 5:
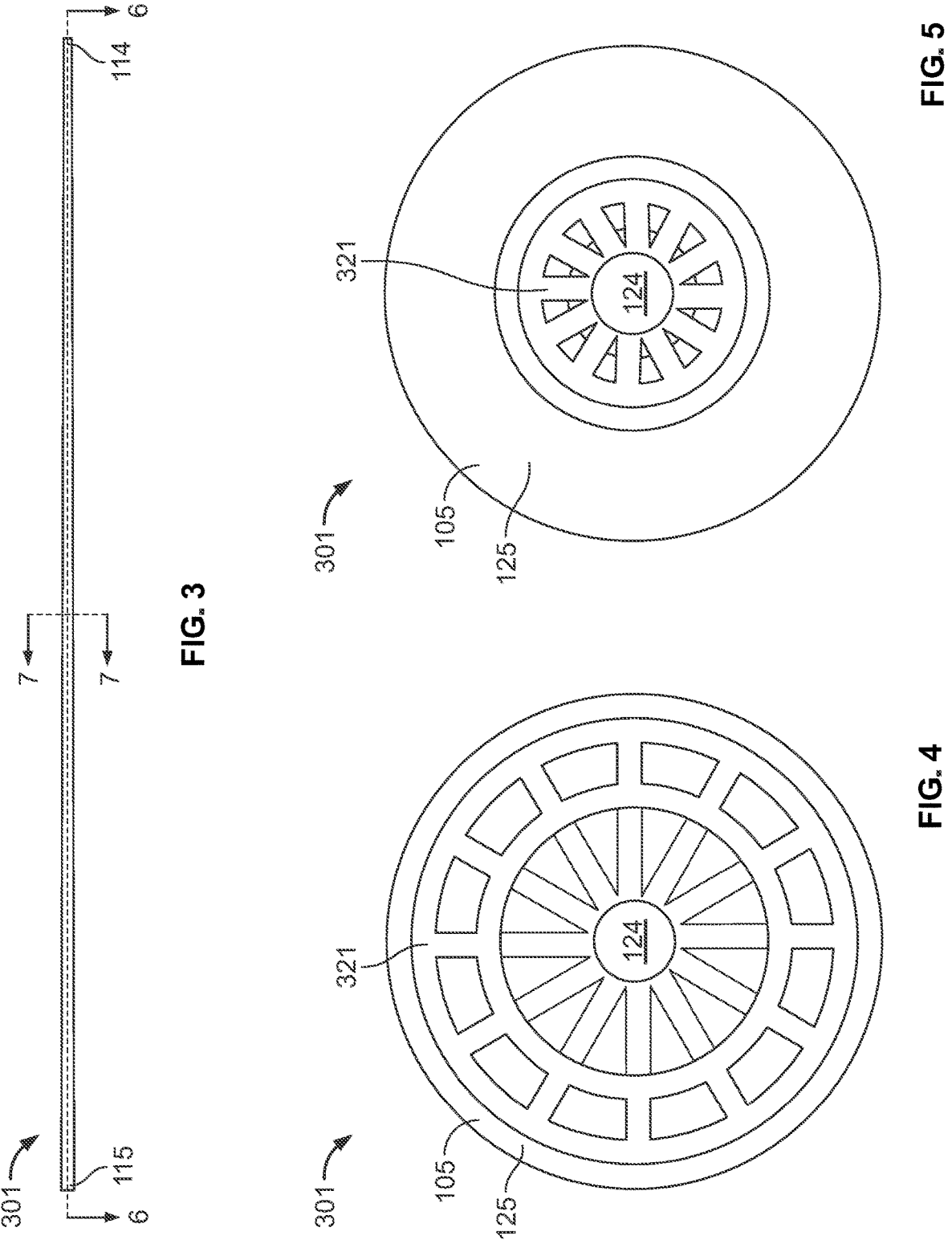
FIG. 3 is a top view of a second example golf club shaft according to an embodiment of the present disclosure.
FIG. 4 is an end view of the second example golf club shaft of FIG. 3.
FIG. 5 is another end view of the second example golf club shaft of FIGS. 3 and 4.
Figures 6, 7:
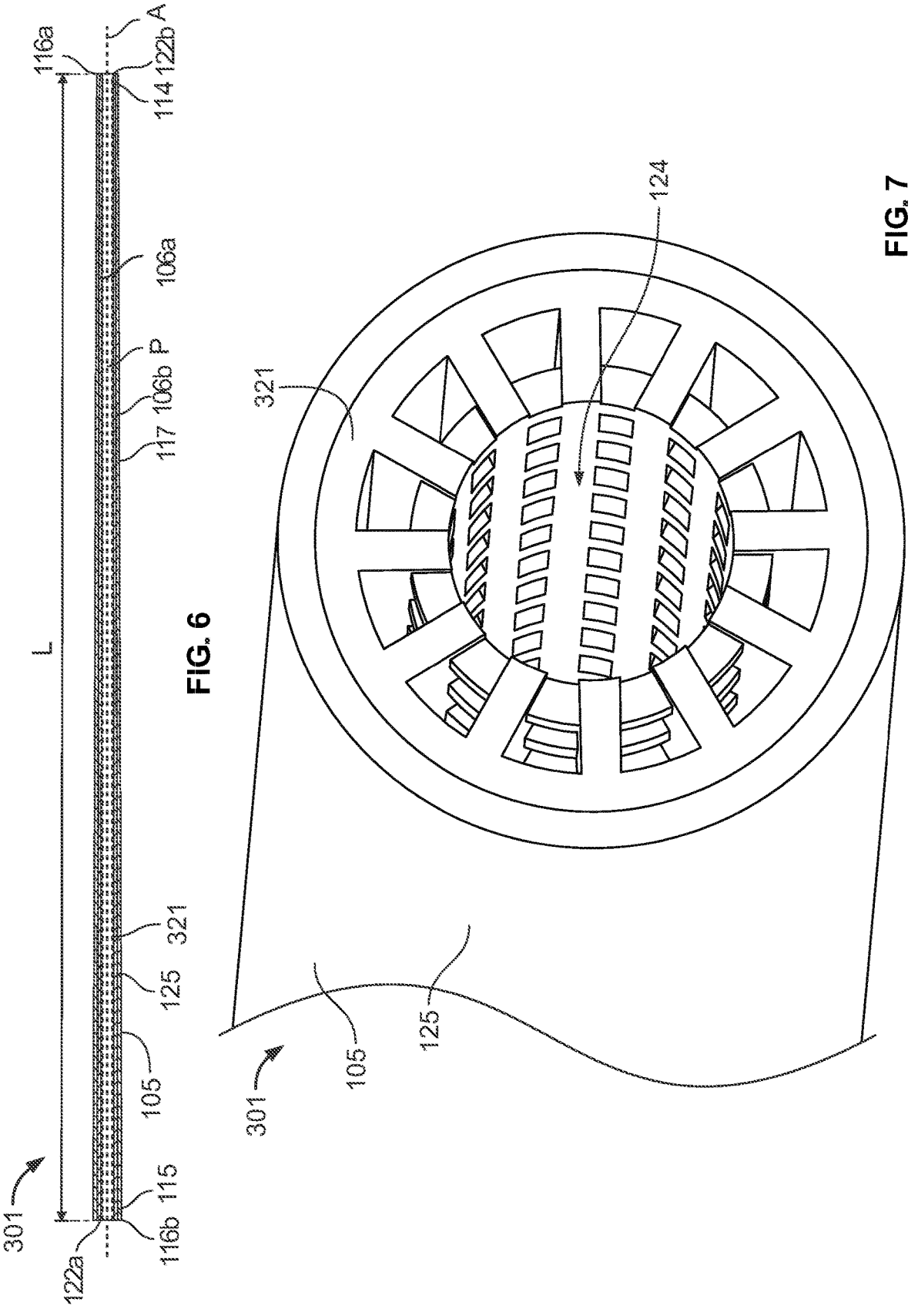
FIG. 6 is a cross-sectional view of the second example golf club shaft of FIGS. 3, 4, and 5 taken along line 6-6 of FIG. 3.
FIG. 7 is a partial isometric cross-sectional view of the second example golf club shaft of FIGS. 3-6 taken along line 7-7 of FIG. 3.
Figures 8, 9, 10:
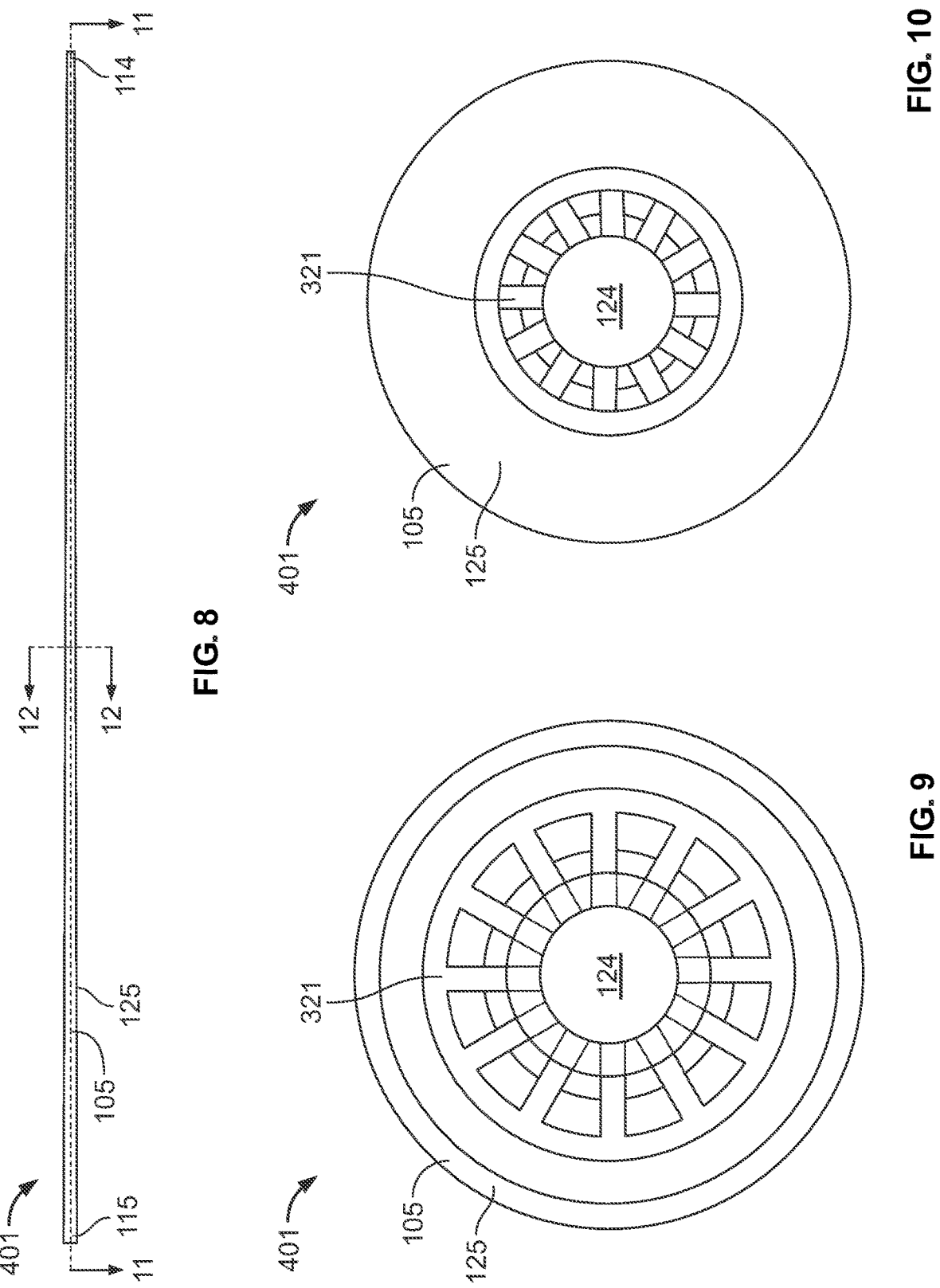
FIG. 8 is a top view of a third example golf club shaft according to an embodiment of the present disclosure.
FIG. 9 is an end view of the third example golf club shaft of FIG. 8.
FIG. 10 is another end view of the third example golf club shaft of FIGS. 8 and 9.

With reference to FIGS. 3-7 a second example golf club 301 is depicted. With reference to FIGS. 4-7, the second example golf club shaft 301 includes the extended body 105 and a second example lattice structure 321. It should be understood that the second example golf club shaft 301 is a variation of the first example golf club shaft 101. To that end, the extended body 105 of the golf club shaft 301 defines the longitudinal axis A through which the plane P extends (shown extending orthogonal to the cross-sectional view of FIG. 6). The plane P defines the first side 106*a* of the extended body 105 and the second side 106*b* of the extended body 105. Further, the extended body 105 includes the tip end 114 that defines the shaft bottom 116*a*, the opposed butt end 115 that defines the shaft top 116*b*, and the outer surface 117. In addition, the lattice structure 321, like the lattice structure 121, includes the top side or lattice structure top 122*a* and the bottom side or lattice structure bottom 122*b*. Looking particularly at FIG. 6, the extended body 105 has a length L. In the second example golf club shaft 301, the lattice structure 321 is continuously disposed in the interior cavity 124 along the length L of extended body 105, such that the lattice structure top 122*a* is coextensive with the shaft top 116*b* at the butt end 115 and the lattice structure bottom 122*b* is coextensive with the shaft bottom 116*a* at the tip end 114. In other words, the lattice structure 321 fills the interior cavity 124 and internally engages the extended body 105. Thus, the extended body 105 is stiffened by the lattice structure 321 along the entire length L. With reference to FIGS. 4, 5, and 7, in some embodiments the extended body 105 is round in cross section (e.g., circular, ovate, ellipsoid, etc.). Further, in some embodiments, the extended body 105 is tapered from the butt end 114 to the tip end 115. Thus, in some embodiments, the extended body 105 is partially conical. Thus, with reference to FIGS. 4, 5, and 6, in some embodiments, the lattice structure 321 is also tapered. Further, in some embodiments, the lattice structure 321 is partially conical.

With reference to FIGS. 8-12 a third example golf club 401 is depicted. With reference to FIGS. 9-12, the third example golf club shaft 401 includes the extended body 105 and the second example lattice structure 321. It should be understood that the third example golf club shaft 401 is a variation of the first example golf club shaft 101 and the second example golf club shaft 301. To that end, the extended body 105 of the golf club shaft 401 defines the longitudinal axis A through which the plane P extends (shown extending orthogonal to the cross-sectional view of FIG. 11). The plane P defines the first side 106*a* of the extended body 105 and the second side 106*b* of the extended body 105. Further, the extended body 105 includes the tip end 114 that defines the shaft bottom 116*a*, the opposed butt end 115 that defines the shaft top 116*b*, and the outer surface 117. In addition, the lattice structure 321 includes the top side or lattice structure top 122*a* and the bottom side or lattice structure bottom 122*b*. Further, the first gap 123*a* is formed between the shaft top 116*b* and the lattice structure top 122*a*, and the second gap 123*b* is formed between the shaft bottom 116*a* and the lattice structure bottom 122*b*.

Figures 11, 12:
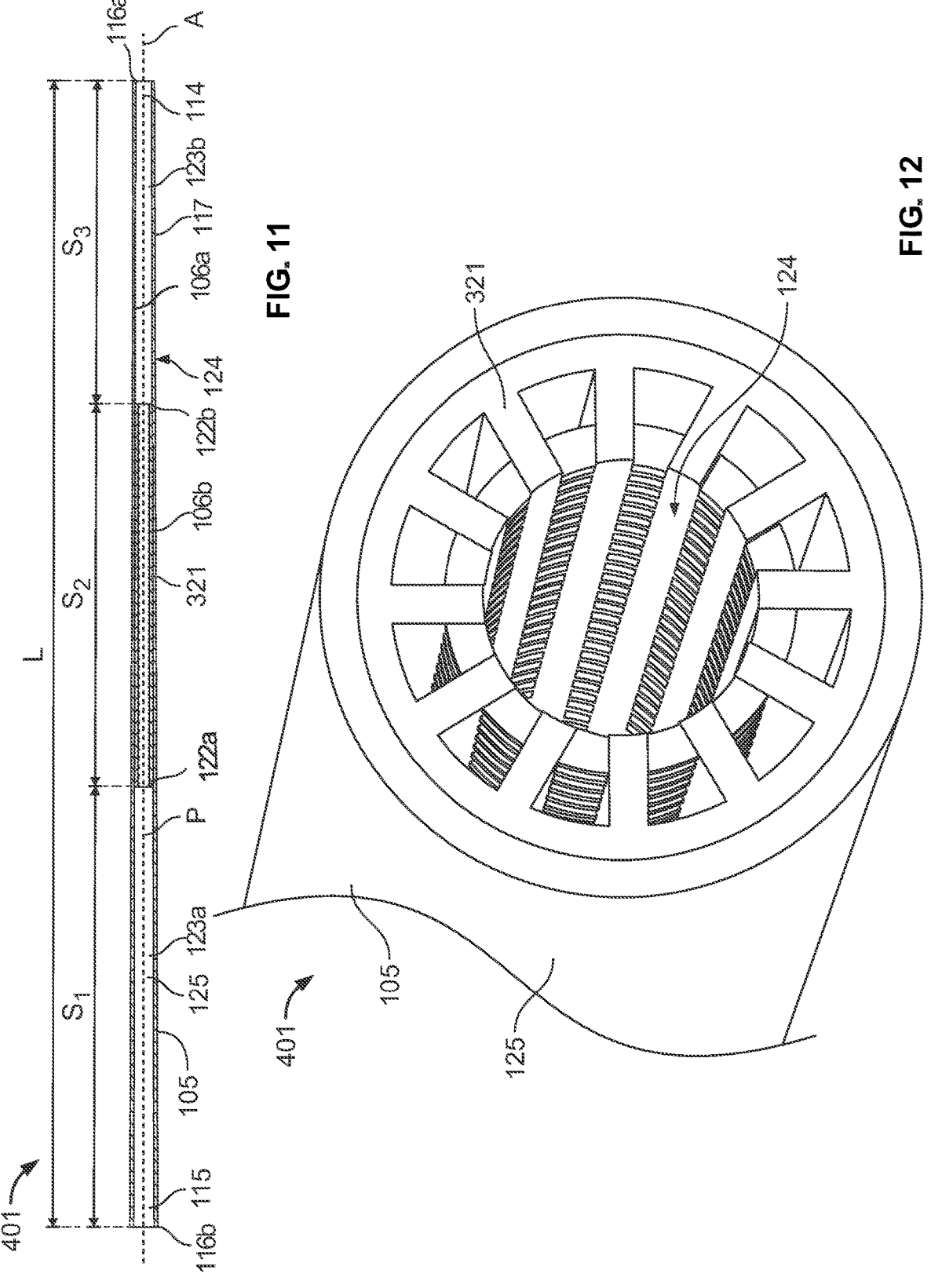
FIG. 11 is a cross-sectional view of the third example golf club shaft of FIGS. 8, 9, and 10 taken along line 11-11 of FIG. 8.
FIG. 12 is a partial isometric cross-sectional view of the third example golf club shaft of FIGS. 8-11 taken along line 12-12 of FIG. 8.

With reference to FIG. 11, the length L of the extended body 105 may be divided into a first section $S_1$, a second section $S_2$, and a third section $S_3$. The second section $S_2$ is between the first section $S_1$ and the third section $S_3$. In the third example golf club shaft 401, the lattice structure 321 is disposed in the interior cavity 124 along the second section $S_2$ of the extended body 105. In other words, the lattice structure 321 partially fills the interior cavity 124 and internally engages the extended body 105. Thus, the lattice structure 321 is disposed in the extended body 105 between the butt end 114 and the tip end 115.

With reference to FIG. 11, the lattice structure 321 is shorter than the extended body 105. Thus, the extended body 105 is stiffened by the lattice structure 321 along the second section $S_2$, respectively, while the first section $S_1$ and the third section $S_3$ remain unstiffened. Thus, the second example golf club shaft 301 is more flexible along the first section $S_1$ and the third section $S_3$ relative to the second section $S_2$. In other words, by varying a length D of the lattice structure 321 and placement of the lattice structure 321 within the extended body 105 along the length L, the golf club shaft 301 may be selectively and/or variably stiffened.

Figures 13, 14, 15:
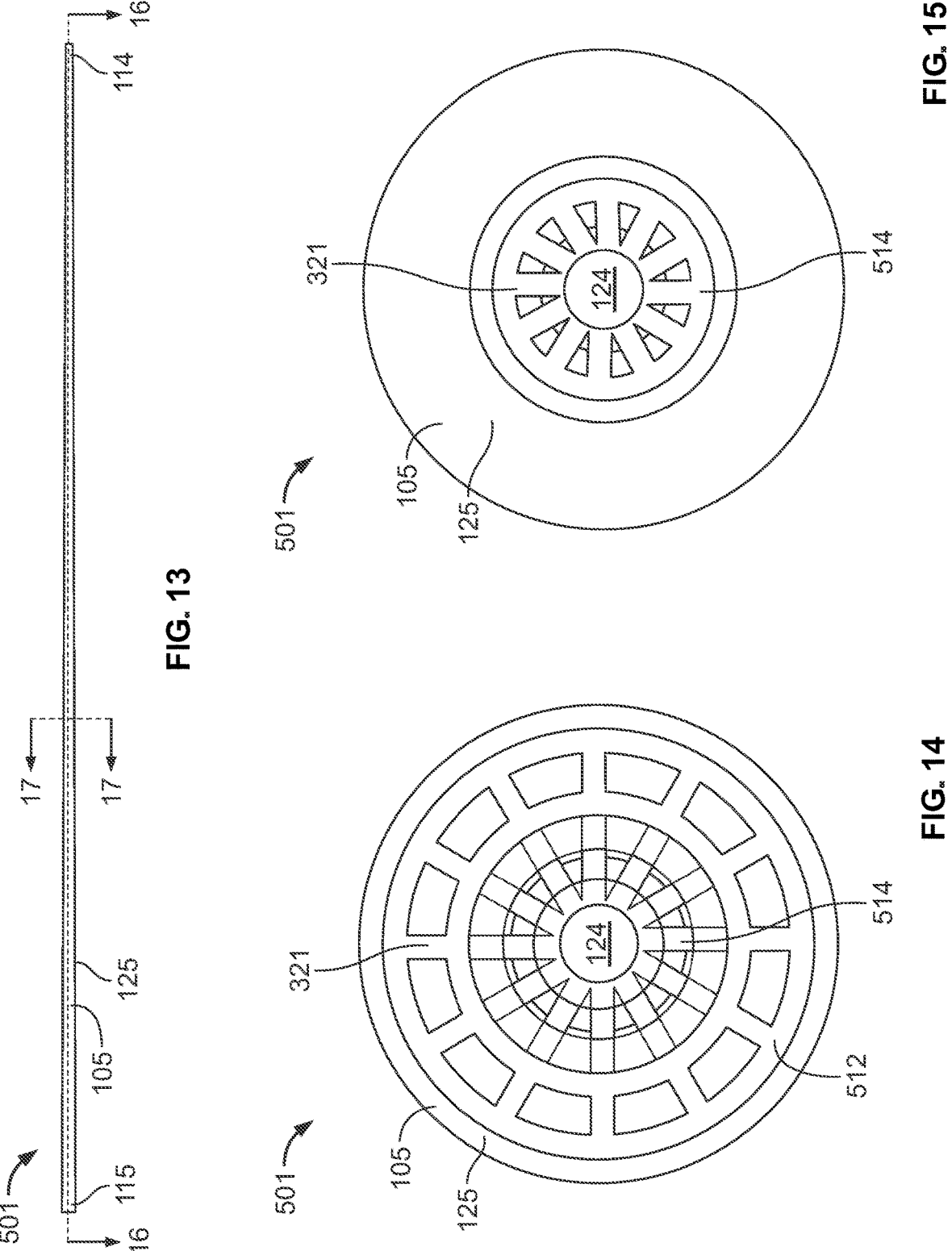
FIG. 13 is a top view of a fourth example golf club shaft according to an embodiment of the present disclosure.
FIG. 14 is an end view of the fourth example golf club shaft of FIG. 13.
FIG. 15 is another end view of the fourth example golf club shaft of FIGS. 13 and 14.
Figures 16, 17:
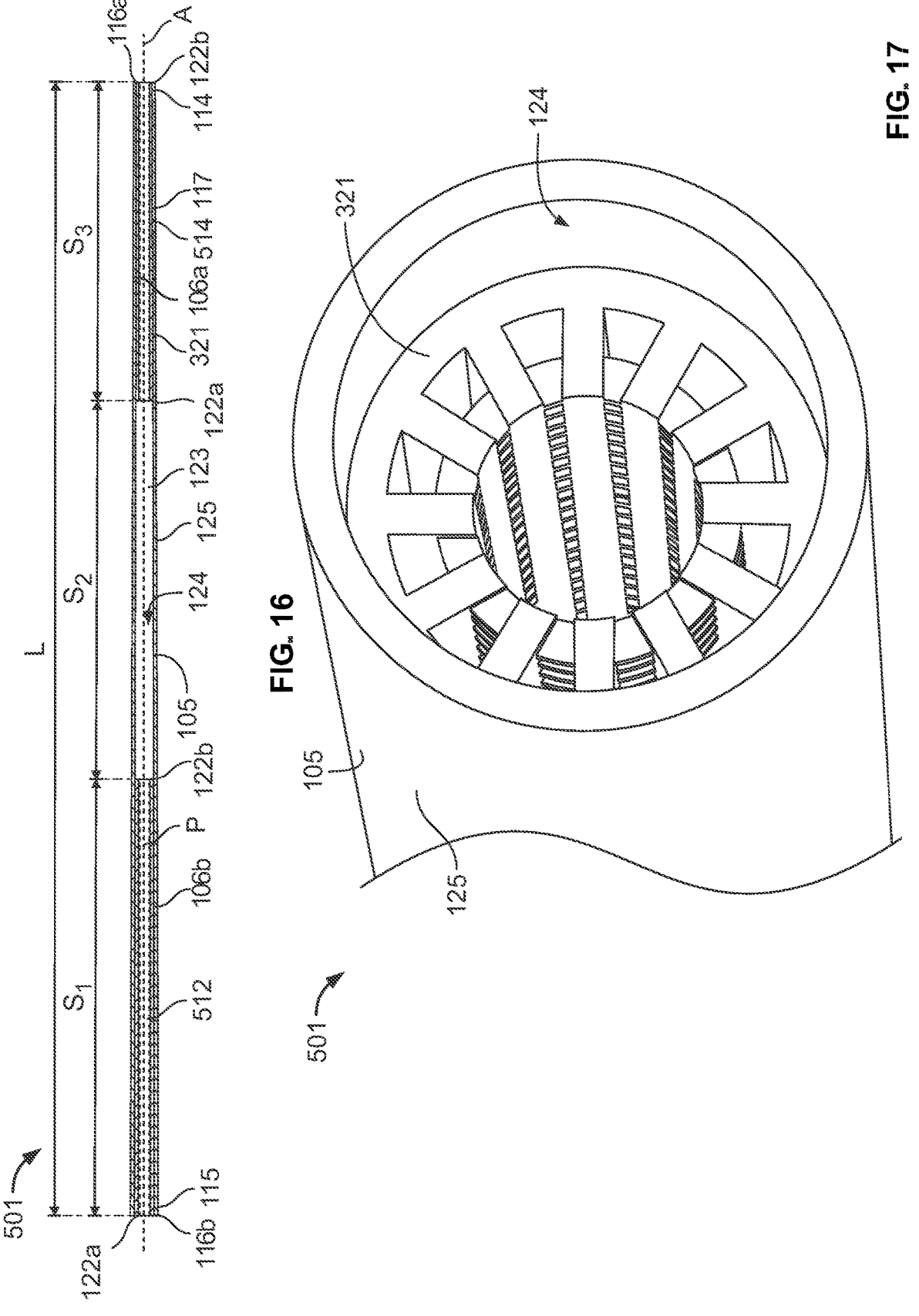
FIG. 16 is a cross-sectional view of the fourth example golf club shaft of FIGS. 13, 14, and 15 taken along line 16-16 of FIG. 13.
FIG. 17 is a partial isometric cross-sectional view of the fourth example golf club shaft of FIGS. 13-16 taken along line 17-17 of FIG. 13.
Figures 18, 19, 20:
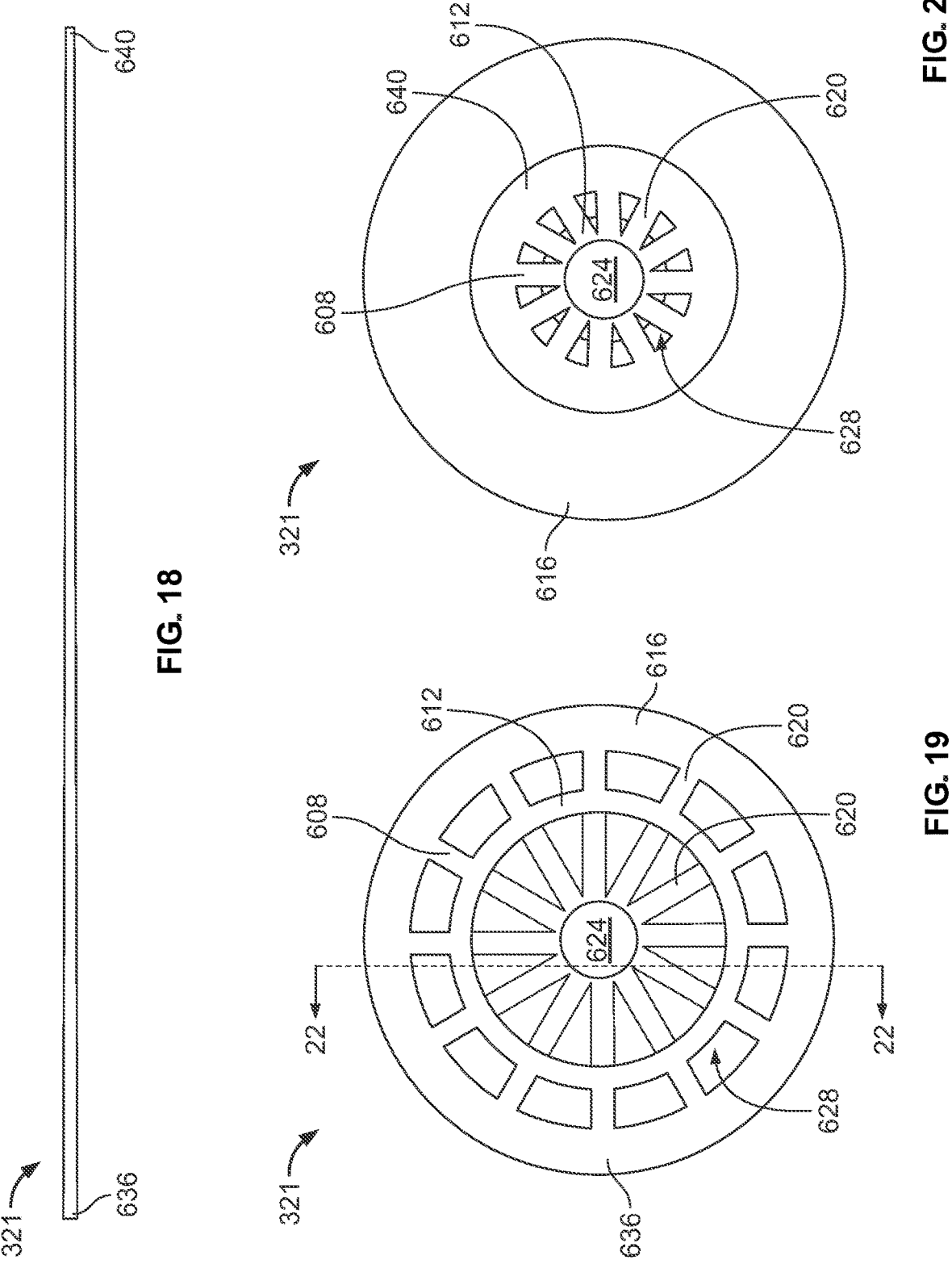
FIG. 18 is a top view of a second example lattice structure according to an embodiment of the present disclosure.
FIG. 19 is an end view of the second example lattice structure of FIG. 18.
FIG. 20 is another end view of the second example lattice structure of FIGS. 18 and 19.
Figure 21:
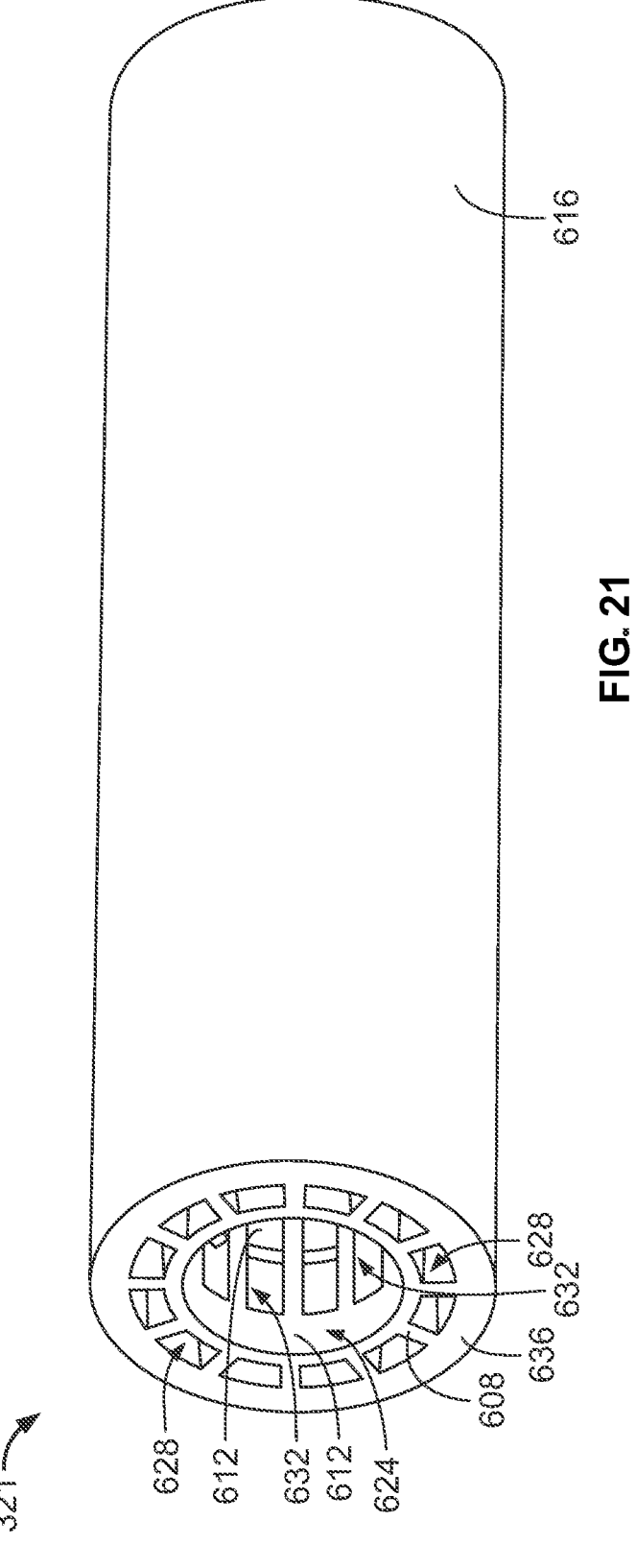
FIG. 21 is a partial isometric view of the second example lattice structure of FIGS. 18, 19, and 20.
Figure 22:
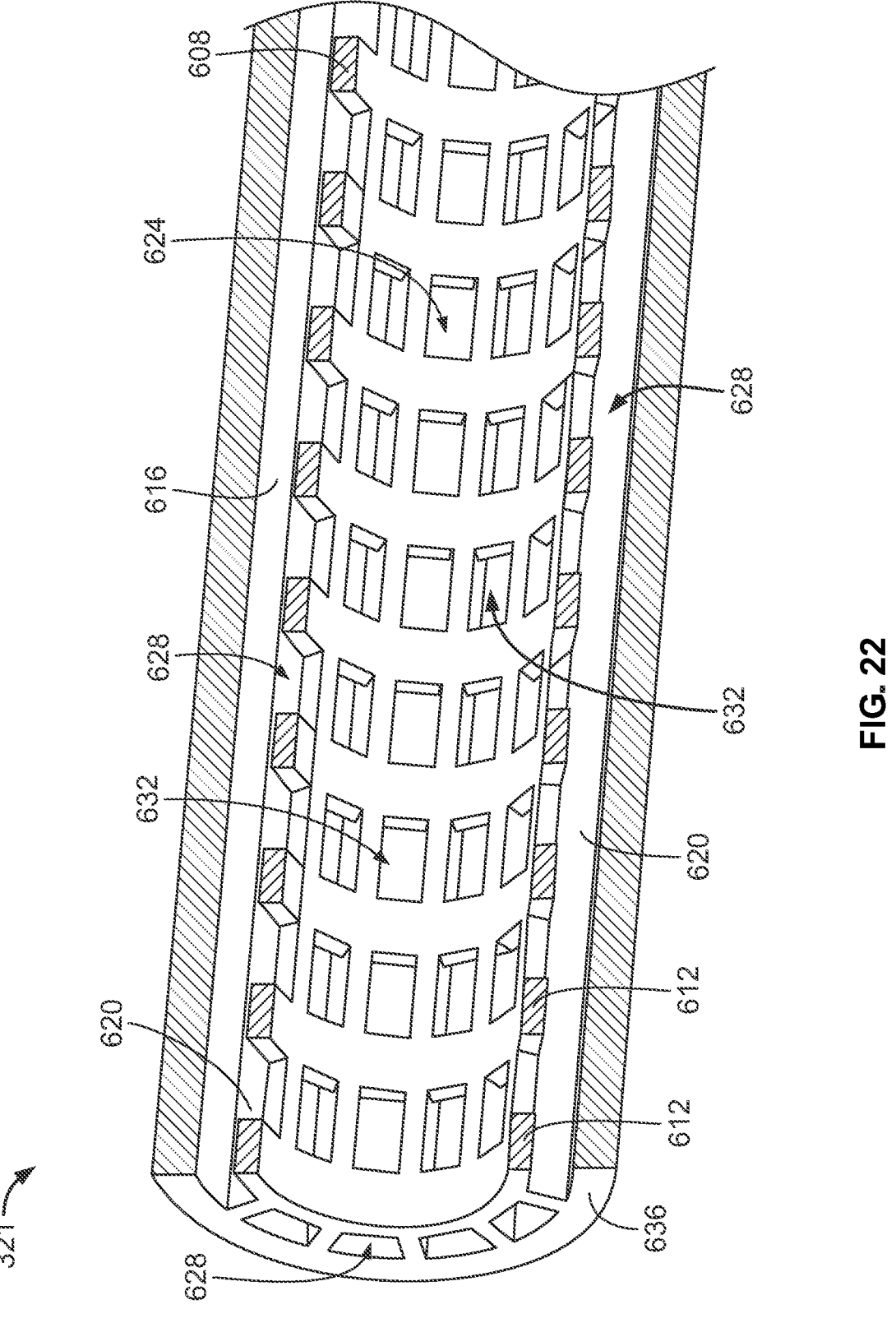
FIG. 22 is a partial isometric cross-sectional view of the second example lattice structure of FIGS. 18-21 taken along line 22-22 of FIG. 19.

With reference to FIGS. 13-17, a fourth example golf club 501 is depicted. With reference to FIGS. 14 and 16, the fourth example golf club shaft 501 includes the extended body 105, a first segment 512 of the second example lattice structure 321, and a second segment 514 of the second example lattice structure 321. It should be understood that the fourth example golf club shaft 501 is a variation of the first, second, and third example golf club shafts 101, 301, 401. To that end, the extended body 105 of the golf club shaft 501 defines the longitudinal axis A through which the plane P extends (shown extending orthogonal to the cross-sectional view of FIG. 16). The plane P defines the first side 106*a* of the extended body 105 and the second side 106*b* of the extended body 105. Further, the extended body 105 includes the tip end 114 that defines the shaft bottom 116*a*, the opposed butt end 115 that defines the shaft top 116*b*, and the outer surface 117. In addition, the lattice structure 321 includes the top side or lattice structure top 122*a* and the bottom side or lattice structure bottom 122*b*.

With reference to FIG. 16, in the fourth example golf club shaft 501, the first segment 512 is disposed in the interior cavity 124 along the first section $S_1$ of the extended body 105 and includes the lattice structure top 122*a* that is coextensive with the shaft top 116*b* at the butt end 115 and opposite the lattice structure bottom 122*b* disposed within the interior cavity 124. Thus, the first segment 512 is shorter than the extended body 105. Further, the second segment 514 is disposed in the interior cavity 124 along the third section $S_3$ of the extended body 105 and includes the lattice structure bottom 122*b* that is coextensive with the shaft bottom 116*a* at the tip end 114 and opposite the lattice structure 122*a* disposed within the interior cavity 124. Thus, the second segment 514 is also shorter than the extended body 105. The gap 123 is formed between the lattice structure top 122*a* of the second segment 514 and the lattice structure bottom 122*b* of the first segment 512. In other words, the first segment 512 and the second segment 514 are separate from one another, partially fill the interior cavity 124, and internally engage the extended body 105.

With reference to FIG. 16, the combined length of the first segment 512 and the second segment 514 is shorter than the extended body 105. Thus, the extended body 105 is stiffened by the first segment 512 and the second segment 514 along the first section $S_1$ and the third second $S_3$ while the second section $S_2$ remains unstiffened. Thus, the fourth example golf club shaft 501 is more flexible along the second section $S_2$ relative to the first section $S_1$ and the third section $S_3$. In other words, by varying a first length $D_1$ of the first segment 512 and a second length $D_2$ of the second segment 514 and varying placement of the first and second segments 512, 514 within the extended body 105 along the length L, the golf club shaft 501 may be selectively and/or variably stiffened.

With reference to FIGS. 18-22, an example segment 602 of the second example lattice structure 321 is depicted. It should be understood that the second example lattice structure 321 may be constructed to have any length. Further, as explained above, multiple separate segments of lattice material 321 may be utilized to variably and/or selectively stiffen the extended body 105 (shown in FIGS. 6, 11, and 16). Additionally, one or more segments of the second example lattice structure 321 may be used in conjunction with one or more segments of the first example lattice structure 121 (shown in FIG. 1) to variably and/or selectively stiffen the extended body 105.

With reference to FIGS. 19-22, the lattice structure 321 includes a plurality of lattice branches 608 that are interconnected to one another. The plurality of branches 608 are interconnected to form a plurality of inner rings 612, an outer wall 616, and a plurality of ribs 620. The plurality of inner rings 612 and the plurality of ribs 620 are disposed in the outer wall 616. The plurality of ribs 620 extend inwardly from the outer wall 616 and longitudinally along the outer wall 616. The plurality of ribs 620 connect the outer wall 616 to the plurality of inner rings 612. Additionally, the plurality of ribs 620 connect the inner rings 612 to one another.

With reference to FIGS. 19-22, the plurality of inner rings 612 and the plurality of ribs 620 define an inner passage 624. The outer wall 616, the plurality of inner rings 612, and the plurality of ribs 620 define a plurality of outer passages 628. The plurality of inner rings 612 and the plurality of ribs 620 define a plurality of radial passages 632. The inner passage 624 is in communication with the plurality of outer passages 628 via the plurality of radial passages 632. The outer wall 616 is depicted as generally solid in the examples of FIGS. 18-22. It should be understood that, in some embodiments, the outer wall 616 is perforated to define openings (not shown) in communication with the outer passages 628.

With reference to FIGS. 19-22, the outer wall 616 is round in cross section (e.g., circular, ovate, ellipsoid, etc.) and tapered to follow the taper of the extended body 105 (shown in FIGS. 6, 11, and 16). Thus, in some embodiments, the outer wall 616 is partially conical. Similarly, the inner rings 612 are round in cross section. In some embodiments, the inner rings 612 successively narrow in diameter from a top end 636 to a bottom end 640 to follow the taper of the outer wall 616. Further, with reference to FIGS. 19 and 20, in some embodiments, the ribs 620 approach one another from the top end 636 to the bottom end 640 to follow the taper of the outer wall 616. Thus, in some embodiments, as the ribs 620 approach the bottom end 640, the ribs 620 transitionally connect to one another to form one or more of the inner rings 612.

With reference to FIGS. 23-27, a fifth example golf club shaft 701 is depicted. With reference to FIGS. 24-27, the fifth example golf club shaft 701 includes the extended body 105 and a third example lattice structure 721. It should be understood that the fifth example golf club shaft 701 is a variation of the first, second, third, and fourth example golf club shafts 101, 301, 401, 501. To that end, the extended body 105 of the golf club shaft 701 defines the longitudinal axis A through which the plane P extends (shown extending orthogonal to the cross-sectional view of FIG. 26). The plane P defines the first side 106a of the extended body 105 and the second side 106b of the extended body 105. Further, the extended body 105 includes the tip end 114 that defines the shaft bottom 116a, the opposed butt end 115 that defines the shaft top 116b, and the outer surface 117. In addition, the lattice structure 721, like the lattice structure 121, includes the top side or lattice structure top 122a and the bottom side or lattice structure bottom 122b. It should also be understood that the third example lattice structure 721 may be constructed to have any length. Further, multiple separate segments of third lattice structure 721 may be utilized to variably and/or selectively stiffen the extended body 105. Additionally, one or more segments of the third example lattice structure 721 may be used in conjunction with one or more segments of the first example lattice structure 121 (shown in FIG. 1) and/or the second example lattice structure 321 (shown in FIGS. 19-22) to variably and/or selectively stiffen the extended body 105.

Figures 26, 27:
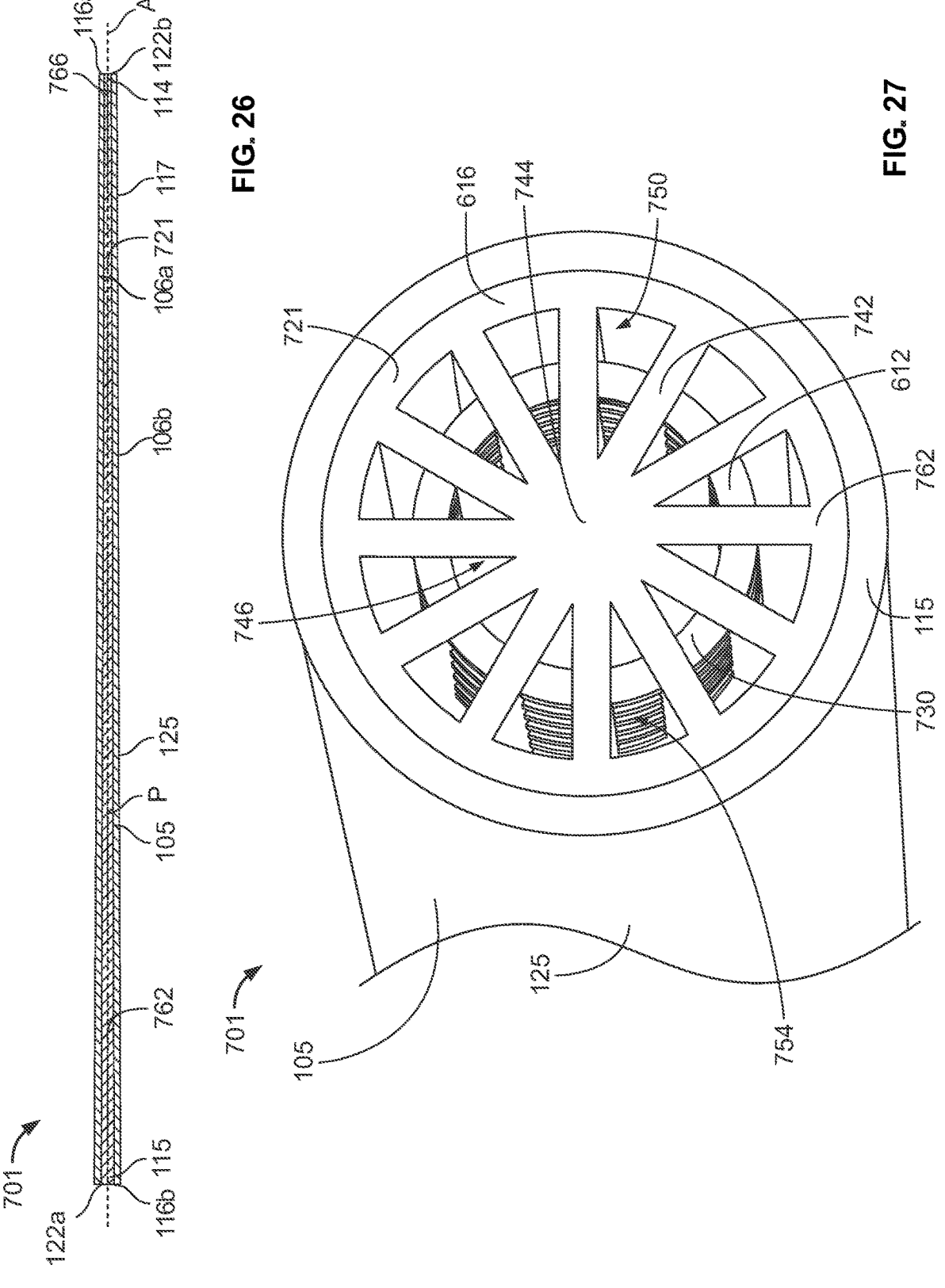
FIG. 26 is a cross-sectional view of the fifth example golf club shaft of FIGS. 24, 24, and 25 taken along line 26-26 of FIG. 23.
FIG. 27 is a partial isometric cross-sectional view of the fifth example golf club shaft of FIGS. 23-27 taken along line 27-27 of FIG. 23.

Looking particularly at FIG. 26, in the fifth example golf club shaft 701, the lattice structure 721 is continuously disposed in the interior cavity 124 along the length L of extended body 105, such that the lattice structure top 122a is coextensive with the shaft top 116b at the butt end 115 and the lattice structure bottom 122b is coextensive with the shaft bottom 116a at the tip end 114. In other words, the lattice structure 721 fills the interior cavity 124 and internally engages the extended body 105. Thus, the extended body 105 is stiffened by the lattice structure 721 along the entire length L. With reference to FIG. 26, because the extended body 105 is tapered from the butt end 114 to the tip end 115, as explained above, in some embodiments, the lattice structure 721 is also tapered. Thus, with reference to FIGS. 24-27, in some embodiments, the lattice structure 721 is partially conical.

Figures 23, 24, 25:
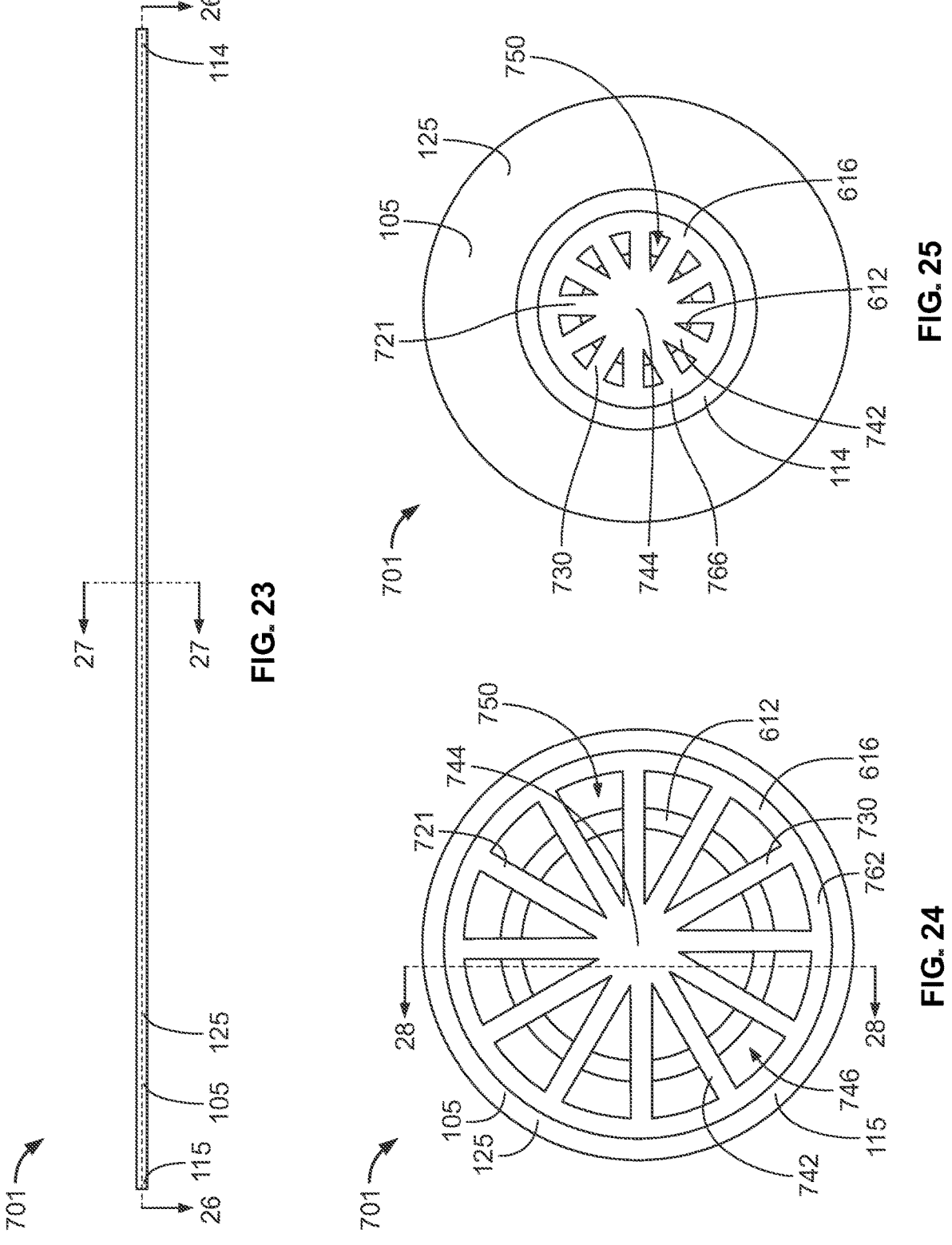
FIG. 23 is a top view of a fifth example golf club shaft according to an embodiment of the present disclosure.
FIG. 24 is an end view of the fifth example golf club shaft of FIG. 23.
FIG. 25 is another end view of the fifth example golf club shaft of FIGS. 23 and 24.

With reference to FIGS. 24, 25, and 27, the second example lattice structure 721 includes a plurality of lattice branches 730 that are interconnected to one another. The plurality of lattice branches 730 are interconnected to form the plurality of inner rings 612, the outer wall 616, a plurality of spokes 742, and a hub 744. The plurality of spokes 742 and the hub 744 are disposed in the outer wall 616. The plurality of spokes 742 extend inwardly from the outer wall 616 and longitudinally along the outer wall 616. The plurality of spokes 742 connect the outer wall 616 to the inner rings 612. The plurality of spokes 742 connect the inner rings 612 to the hub 744. Additionally, the plurality of spokes 742 connect the inner rings 612 to one another.

Figure 28:
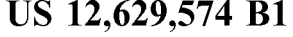
FIG. 28 is a partial isometric cross-sectional view of the fifth example golf club shaft of FIGS. 23-27 taken along line 28-28 of FIG. 24.

With reference to FIGS. 24, 27, and 28, the spokes 742, the inner rings 612, and the hub 744 define a plurality of inner passages 746. In some embodiments, the inner passages 746 are thus triangular and/or pie slice-shaped in cross section. Further, the spokes 742, the outer ring 616, and the inner rings 612 define a plurality of outer passages 750. With reference to FIGS. 27 and 28, the inner rings 612 and the spokes 742 define a plurality of radial passages 754. The inner passages 746 are in communication with the outer passages 750 via the radial passages 754.

With reference to FIGS. 24, 25, 27, and 28, in some embodiments, the inner rings 612 successively narrow in diameter from a top end 762 to a bottom end 766 (shown in FIGS. 25 and 26) to follow the taper of the outer wall 616. Thus, with reference to FIG. 25, in some embodiments, as the inner rings 612 approach the bottom end 766, the inner rings 612 transitionally connect to the hub 744.

Figures 29, 30:
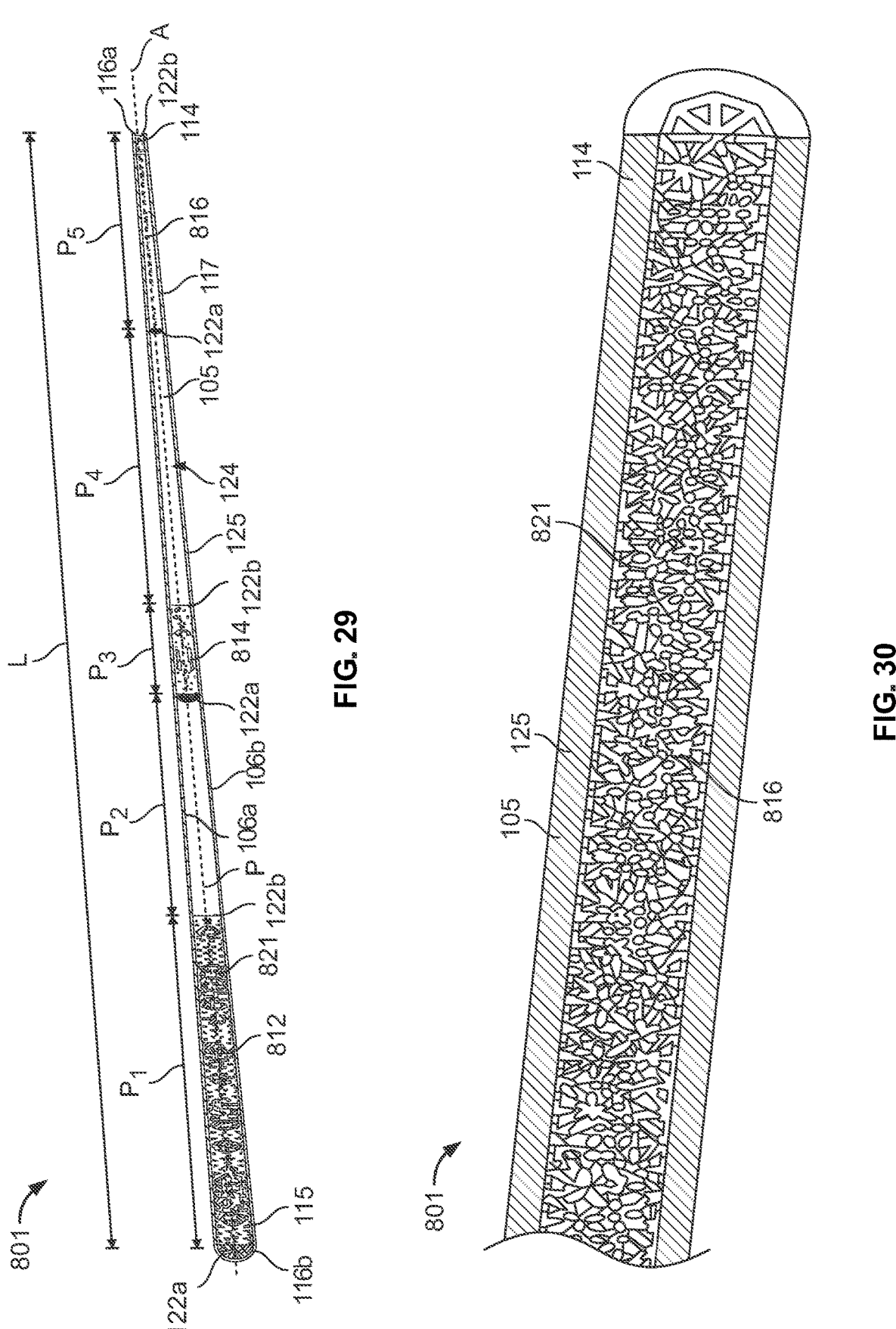
FIG. 29 is a is an isometric cross-sectional view of a sixth example golf club shaft according to an embodiment of the present disclosure.
FIG. 30 is a partial isometric cross-sectional view of the sixth example golf club shaft of FIG. 29.

With reference to FIGS. 29 and 30, a sixth example golf club shaft 801 is depicted. The sixth example golf club shaft 801 includes the extended body 105, a first segment 812, a second segment 814, and a third segment 816. In the sixth example golf club shaft 801, the first segment 812, the second segment 814, and the third segment 816 are formed of a third example lattice structure 821. It should be understood that the sixth example golf club shaft 801 is a variation of the first, second, third, fourth, and fifth example golf club shafts 101, 301, 401, 501, 701. To that end, the extended body 105 of the golf club shaft 801 defines the longitudinal axis A through which the plane P extends (shown extending orthogonal to the cross-sectional view of FIG. 29). The plane P defines the first side 106a of the extended body 105 and the second side 106b of the extended body 105. Further, the extended body 105 includes the tip end 114 that defines the shaft bottom 116a, the opposed butt end 115 that defines the shaft top 116*b*, and the outer surface 117. In addition, the lattice structure 821, like the lattice structure 121, includes the top side or lattice structure top 122*a* and the bottom side or lattice structure bottom 122*b*.

With reference to FIG. 29, the length L of the extended body 105 may be divided into a first portion $P_1$, a second portion $P_2$, a third portion $P_3$, a fourth portion $P_4$, and a fifth portion $P_5$. The second portion $P_2$ is between the first portion $P_1$ and the third portion $P_3$. The third portion $P_3$ is between the second portion $P_2$ and the fourth portion $P_4$. The fourth portion $P_4$ is between the third portion $P_5$ and the fifth portion $P_5$.

With reference to FIG. 29, the first segment 812 is disposed in the interior cavity 124 along the first portion $P_1$ of the extended body 105 and includes the lattice structure top 122*a* that is coextensive with the shaft top 116*b* at the butt end 115 and opposite the lattice structure bottom 122*b* disposed within the interior cavity 12. Thus, the first segment 812 is shorter than the extended body 105. Further, the second segment 814 is disposed in the interior cavity 124 along the third portion $P_3$ of the extended body 105 and includes the lattice structure 122*a* opposite the lattice structure bottom 122*b*, both of which are disposed within the interior cavity 124. Thus, the second segment 814 is also shorter than the extended body 105. Further, the third segment 816 is disposed in the interior cavity 124 along the fifth portion $P_5$ of the extended body 105 and includes the lattice structure top 122*a* disposed within the interior cavity 124 and opposite the lattice structure bottom 122*b* that is coextensive with the shaft bottom 116*a* at the tip end 114. Thus, the third segment 816 is also shorter than the extended body 105. In other words, the first segment 812, the second segment 814, and the third segment 816 are separate from one another, partially fill the interior cavity 124, and internally engage the extended body 105. With reference to FIG. 29, because the extended body 105 is tapered from the butt end 114 to the tip end 115, as explained above, in some embodiments, the first segment 812, the second segment 814, and the third segment 816 are also tapered. Thus, with reference to FIG. 29, in some embodiments, the first segment 812, the second segment 814, and the third segment 816 are partially conical.

With reference to FIG. 29, the combined length of the first segment 812, the second segment 814, and the third segment 816 is shorter than the extended body 105. Thus, the extended body 105 is stiffened by the first segment 812, the second segment 814, and the third segment 816 along the first portion $P_1$, the third portion $P_3$, and the third portion $P_3$, respectively, while the second portion $P_2$ and the fourth portion $P_4$ remain unstiffened. Thus, the sixth example golf club shaft 801 is more flexible along the second portion $P_2$ and the fourth portion $P_4$ relative to the first portion $P_1$, the third portion $P_3$, and the third portion $P_3$. In other words, by varying a first length $D_1$ of the first segment 812, a second length $D_2$ of the second segment 814, and a third length $D_3$ of the third segment 816 and varying placement of the first, second, and third segments 812, 814, 816 within the extended body 105 along the length L, the golf club shaft 801 may be selectively and/or variably stiffened.

Figures 31, 32:
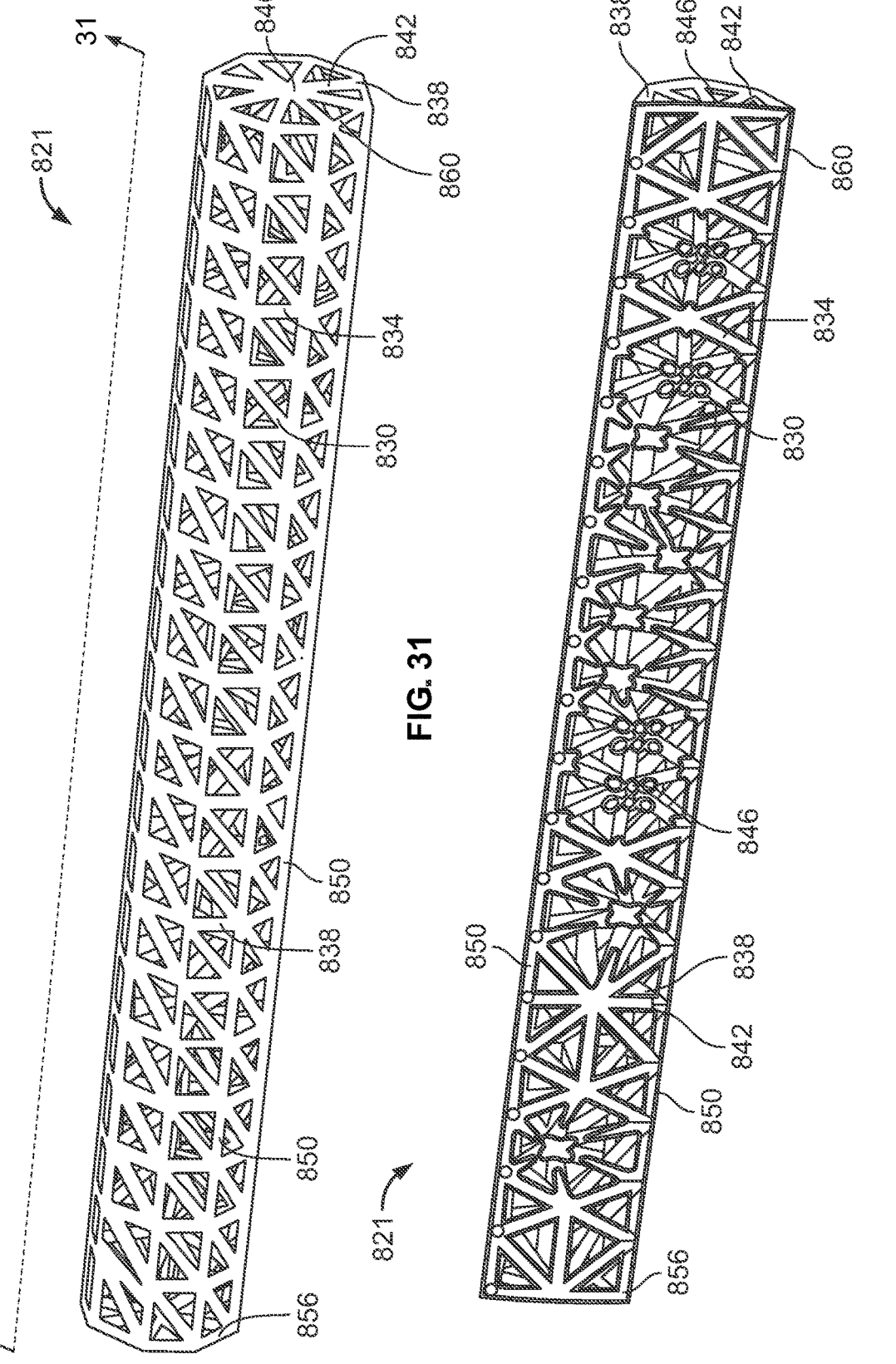
FIG. 31 is an isometric view of a fourth example lattice structure according to an embodiment of the present disclosure.
FIG. 32 is an isometric cross-sectional view of the fourth example lattice structure of FIG. 31 taken along line 32-32 of FIG. 31.

With reference to FIGS. 31 and 32, the fourth example lattice structure 821 is depicted. The fourth example lattice structure 821 includes a plurality of lattice branches 830 that are interconnected with one another to form a plurality of trellises 834. It should be understood that each trellis 834 is a triangular grouping of three neighboring lattice branches 830 connected to one another. Individual lattice branches 830 may belong to one or more trellises 834. The plurality of trellises 834 are connected to form a plurality of rings 838, a plurality of spokes 842, a plurality of hubs 846, and a plurality of outer ribs 850. The spokes 842 and the hubs 846 are disposed in the rings 838. The spokes 842 extend inwardly from the rings 838 to connect with one another and form the hubs 744. Additionally, the outer ribs 850 connect the rings 838 to one another.

With reference to FIGS. 31 and 32, in some embodiments, the rings 838 successively narrow in diameter from a top end 856 to a bottom end 860 to follow the taper of the extended body 105 (shown in FIGS. 28 and 29). Further, in some embodiments, the outer ribs 850 approach one another from the top end 856 to the bottom end 860 to follow the taper of the extended body 105.

Figures 33, 34:
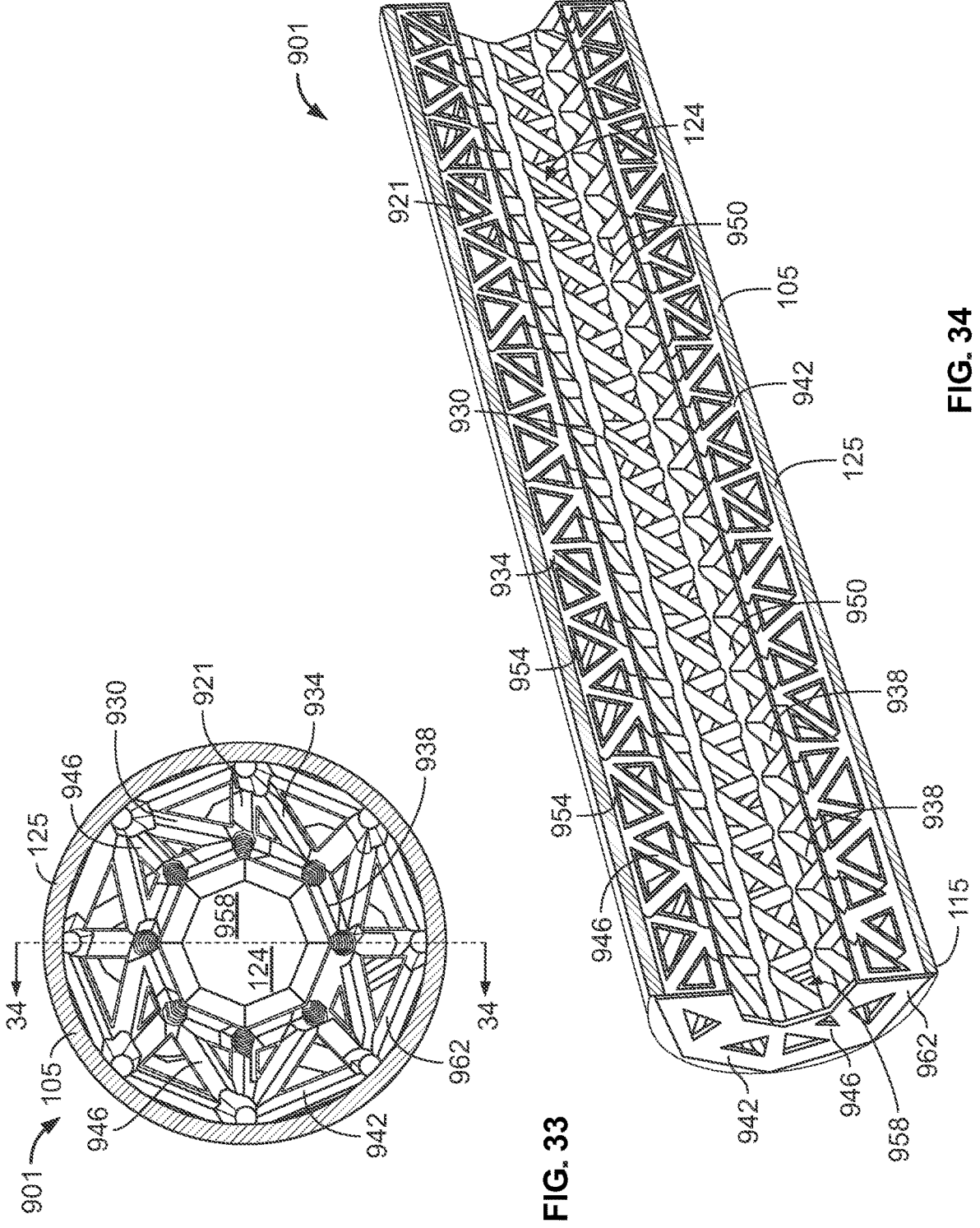
FIG. 33 is an end view of a seventh example golf club shaft according to an embodiment of the present disclosure.
FIG. 34 is a partial isometric cross-sectional view of the seventh example golf club shaft of FIG. 33 taken along line 34-34 of FIG. 33.

With reference to FIGS. 33 and 34, a seventh example golf club shaft 901 is depicted. The seventh example golf club shaft 901 includes the extended body 105 and a fifth example lattice structure 921. It should be understood that the seventh example golf club shaft 901 is a variation of the first, second, third, fourth, fifth, and sixth example golf club shafts 101, 301, 401, 501, 701, 801.

With reference to FIGS. 33 and 34, the fifth example lattice structure 921 includes a plurality of lattice branches 930 that are interconnected with one another to form a plurality of trellises 934. It should be understood that each trellis 934 is a triangular grouping of three lattice branches 930 connected to one another. Individual lattice branches 930 may belong to one or more trellises 934. The plurality of trellises 934 are connected to form a plurality of inner rings 938, a plurality of outer rings 942, and a plurality of radial connectors 946. The plurality of radial connectors 946 extend between and connect the plurality of inner rings 938 to the plurality of outer rings 942. With reference to FIG. 34, the plurality of trellises are also connected to form a plurality of inner ribs 950 and a plurality of outer ribs 954. The plurality of inner ribs 950 connect the plurality of inner rings 938 to one another. The plurality of outer ribs 954 connect the plurality of outer rings 942 to one another. The plurality of inner rings 938 and the plurality of inner ribs 950 define an inner passage 958.

With reference to FIG. 34 the inner rings 938 and the outer rings 942 successively narrow in diameter from a top end 962 to a bottom end (not shown) to follow the taper of the extended body 105. Further, in some embodiments, the inner ribs 950 and the outer ribs 954 approach one another from the top end 962 to the bottom end to follow the taper of the extended body 105.

With reference to FIGS. 1, 6, 11, 16, 26, 29, and 34 respectively, the golf club shafts 101, 301, 401, 501, 701, 801, 901, instead of varying wall thickness of the outer layer 125 and location to influence stiffness, may utilize the addition of one or more of the first, second, third, fourth, and fifth lattice structures 121, 321, 721, 821, 921 to adjust stiffness in a particular section along the extended body 105 without adding thickness. The shafts 101, 301, 401, 501, 701, 801, 901 may be described according to their shaft cross section. The shafts 101, 301, 401, 501, 701, 801, 901 are preferably made by fused deposition modeling (FDM).

With reference to FIGS. 1, 6, 11, 16, 26, 29, and 34 respectively, using FDM techniques, carbon threads may be added to the perimeters of the shafts 101, 301, 401, 501, 701, 801, 901.

With reference to FIGS. 1, 6, 11, 16, 26, 29, and 34 respectively, making the shafts 101, 301, 401, 501, 701, 801, 901 includes creating at least a portion of the shafts 101, 301, 401, 501, 701, 801, 901 with a 3D printer. If the 3D-printed portion is to be as long as the finished shafts 101,

301, 401, 501, 701, 801, 901, it may be preferable to use a 3D printing system that can print an object with a dimension as long as the golf club shafts 101, 301, 401, 501, 701, 801, 901. For example, it may be beneficial to use a 3D printing system that can print at least about 1300 mm (e.g., approx. 48 inches) in one direction.

With reference to FIGS. 1, 6, 11, 16, 26, 29, and 34 respectively, in some embodiments, the shafts 101, 301, 401, 501, 701, 801, 901 may be 3D printed piecemeal in sections shorter than the length L. The sections may then be assembled together to reach the designed length L of the shafts 101, 301, 401, 501, 701, 801, 901.

One suitable 3D printing system may use the industrial 3D printer sold under the trademark BIGREP PRO by BigRep America Inc. (Woburn, MA). The BigRep PRO is a large scale material extrusion 3D printer that uses a dual metering extrusion system (MXT) which enables a fast print speed (up to 600 mm/s) and build rate (400 cm3/hour). The printer includes a humidity-controlled filament spool chamber, closed print chamber, and a CNC closed loop motion control system.

Another suitable 3D printing system that may be used with methods and devices of the disclosure includes the 3D printer sold under the model number EB 2076 LX by Erectorbot, Inc. (Anza, CA). Another suitable 3D printing system that may be used with methods and devices of the disclosure includes the 1500×1100×1500 mm 3D printer sold under the trademark THE BOX by BLB Industries (Varnamo, Sweden). Another suitable 3D printing system that may be used with methods and devices of the disclosure includes one of the 3D printers sold under model number T3000 or T3500 by Tractus3D (Ammerzoden, The Netherlands). Another suitable 3D printing system that may be used with methods and devices of the disclosure includes the FDM 3D printer sold under the model name CoLiDo H4080 by Print-Rite N.A. Inc. (San Francisco, CA). Another suitable 3D printing system that may be used with methods and devices of the disclosure includes the 3D printer sold under the model name DeltaWASP 3MT by WASP c/o CSP S.r.l. (Massa Lombarda, Italy). Another suitable 3D printing system that may be used with methods and devices of the disclosure includes the 3D printer sold as the 400 Series Workbench Xtreme by 3D Platform (Roscoe, IL).

Another suitable 3D printing system that may be used with methods and devices of the disclosure includes the 3D printer sold under the trademark THE ATLAS by Titan Robotics (Colorado Springs, CO). Another suitable 3D printing system that may be used with methods and devices of the disclosure includes the 3D printer sold under the trademark CHEETA PRO by Fouche 3D Printing (Kempton Park, South Africa). Another suitable 3D printing system that may be used with methods and devices of the disclosure includes the 3D printer sold under the trademark EXTREME BUILDER 2000 by Builder 3D Printers B.V. (The Netherlands). Another suitable 3D printing system that may be used with methods and devices of the disclosure includes the large format 3D printer sold under the trademark DELTAZILLA by OTC Innovations Inc dba Zilla3D/Diygranite (Livermore, CA). Another suitable 3D printing system that may be used with methods and devices of the disclosure includes the 3D printer sold under the trademark THE LEAPFROGXCEL by Leapfrog (The Netherlands).

Many 3-D printers have the ability to print in a polymer or similar material such as acrylonitrile butadiene styrene (ABS), carbon (e.g., often carbon filaments or similar material in a plastic or polymer matrix), engineering polylactic acid (E-PLA), flexible combinations of plastic and rubber, high-impact polystyrene (HIPS), co-polyester (CPE), nylon, polyethylene terephthalate (PETG), polypropylene (PP), and scaffold soluble support filament (for complex geometric parts). Some 3D printers can create objects from metal by, for example, direct laser metal sintering. Some 3D printers can create objects from metal by, for example, binder jetting. Some 3D printers can create objects with strands of carbon disposed therein throughout or in select locations. Most 3-D printers that have the ability to print with strands of carbon primarily print in a polymer such as acrylonitrile butadiene styrene (ABS) or nylon.

ABS (Acrylonitrile Butadiene Styrene) has strong material properties which produce parts with high impact, high-temperature resistance. Carbon filament is great for printing strong and durable parts and often contains additional printing materials within its composition (ABS, PETG, NYLON etc.) depending on the product needed. Engineering PLA (Polylactic Acid) is a biodegradable plastic that was formulated to provide greater durability than standard PLA without compromising on its eases of use when printing. Some filaments use a combination of plastic and rubber for the creation of flexible prints with elastic properties. Polyethylene terephthalate is considered the bridge in terms of mechanical properties between PLA and ABS, offering strength, impact resistance and chemical resistance without having issues like warping. Having similar properties to PLA and ABS, PETG is a great filament for a number of applications that require more durability than PLA can offer, while being easier to print with than ABS. Using any of such materials in any combination, a user may produce a golf club shaft with any desirable stiffness or flex and other properties of the disclosure. The stiffness, flex, and feel of a shaft may be evaluated by comparing one shaft to another according to standardized metrics established in the art. One such standardized metric established in the art as a basis for comparing shafts is the EI curve.

The EI curve gives an engineering description of a flex profile as the variation of EI along the shaft. EI is a structural term, the abbreviation of "E times I", where: E stands for "modulus of elasticity", and/stands for "area moment of inertia".

E gives a measure of the stiffness of the material. In particular, E says how much force it takes to stretch the material a given amount. Steel would have a very high E, and rubber a very low E.

I gives a measure of stiffness of the cross sectional geometry of the shaft. Thicker walls or a bigger diameter make for a higher I.

EI measurements include the local stiffness at a location "X" along a given shaft. EI measurements are not an average from X to a tip of the shaft.

For a beam supported at two points with a force applied halfway between those points, the beam will be deflected (bent) by the force. The formula for deflection at the middle, where the force is applied, is described by Equation 1, below.

$$y = \frac{FL^3}{48EI} \qquad \text{Equation 1}$$

In Equation 1, y is the deflection measured downwardly from an initial position while no force is applied; F is the force; L is the length between the supports; and EI is the stiffness of the given shaft.

To measure the EI along a shaft, part of the shaft is supported between two points and a force is applied in the middle between the supports. EI may be computed by solving Equation 1 above into Equation 2 below:

$$EI = \frac{FL^3}{48y} \qquad \text{Equation 2}$$

With reference to FIG. 1, in general, because the stiffness of a golf shaft varies along its length; the EI may be higher at the butt end 115 than at the tip end 114 (e.g., 3 to 4 times higher). An EI profile is a graph of the EI over the length of the extended body 105. Shaft performance is usually described by an EI curve. The lattice structures 121, 321, 721, 821, 921 (shown in FIGS. 1, 22, 28, 30, and 34 respectively) may be added to the extended body 105 to influence the EI curve and performance. The lattice structures 121, 321, 721, 821, 921 may be created with 3-D printing to have varying element sizes, varying element lengths, different structures, and in various sections of the shaft to tailor the EI curve and performance.

With reference to FIGS. 1, 6, 11, 16, 26, 29, and 34 respectively, the disclosed golf club shafts 101, 301, 401, 501, 701, 801, 901 and methods of making them involve 3D printing. Using 3D printing, a designer has fine-grained control over shaft stiffness and flexibility. Embodiments include methods of making golf club shafts 101, 301, 401, 501, 701, 801, 901 that include one or more of the lattice structures 121, 321, 721, 821, 921, in which the shafts 101, 301, 401, 501, 701, 801, 901 may be made by methods that include 3D printing or similar additive manufacturing methods.

With reference to FIGS. 1, 6, 11, 16, 26, 29, and 34 respectively, to make the golf club shafts 101, 301, 401, 501, 701, 801, 901 of the disclosure, a user may create models of one or more of the shafts 101, 301, 401, 501, 701, 801, 901 in a computer-assisted drawing (CAD) program. The user may add one or more of the lattice structures 121, 321, 721, 821, 921 at any point within the extended body 105, in the CAD model. The user can print the model using one of the large-format 3D printers disclosed above. The user can then measure the EI of the 3D printed shaft. The user can then view the measured EI curve. The user can adjust parameters of the CAD model of the shaft.

With reference to FIGS. 1, 6, 11, 16, 26, 29, and 34, parameters that can be adjusted in the CAD model include dimensions and material for the extended body 105 (generally having a substantially tubular shape) as well as dimensions, locations, material, and pore structure for the lattice structures 121, 321, 721, 821, 921 inside of the extended body 105. Material can also be varied along a length of the extended body 105 and/or the lattice structure 121, 321, 721, 821, 921 cores in the CAD model.

The large format 3D printer, in some embodiments, may be operated to 3D print parts of the shafts 101, 301, 401, 501, 701, 801, 901 together, in a "single path". Where unlike materials are printed to together (e.g., a first material embedded within another, a first material abutting another, or a seamless transition from the first material to the second material), the large-format 3D printer can operate to change between filaments to 3D print the first and second (and any additional) materials together.

In some embodiments, the extended body 105 and the lattice structures 121, 321, 721, 821, 921 (shown in FIGS. 1, 22, 28, 30, and 34 respectively) are 3D printed separately from one another. One or more of the lattice structures 121, 321, 721, 821, 921 may then be joined (e.g., welded, bonded, adhered, etc.) with the extended body 105.

Figures 35, 36, 37, 38, 39, 40, 41:
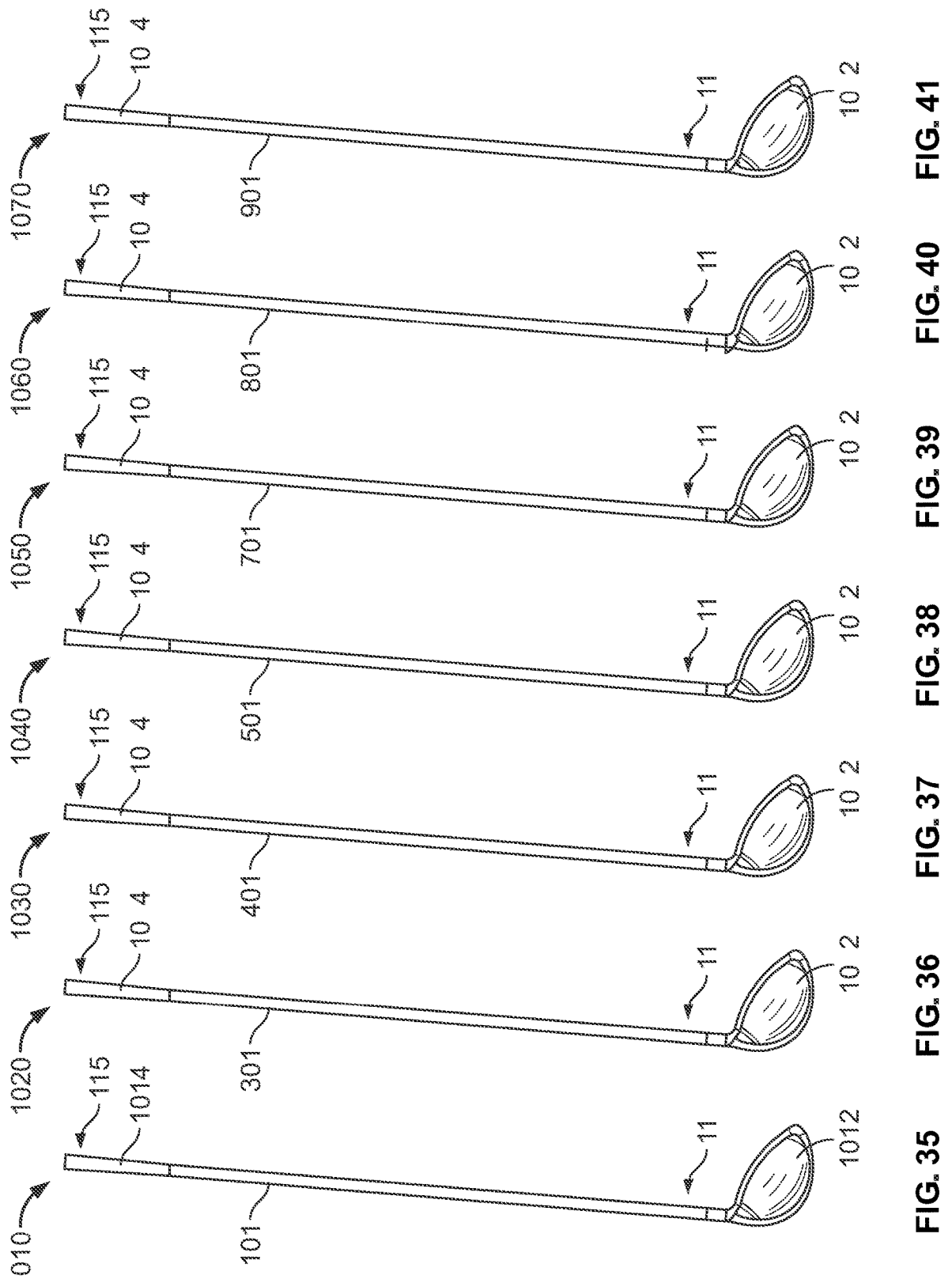
FIG. 35 is an isometric view of a first example golf club.
FIG. 36 is an isometric view of a second example golf club.
FIG. 37 is an isometric view of a third example golf club.
FIG. 38 is an isometric view of a fourth example golf club.
FIG. 39 is an isometric view of a fifth example golf club.
FIG. 40 is an isometric view of a sixth example golf club.
FIG. 41 is an isometric view of a seventh example golf club.

With reference to FIG. 35, a first example golf club 1010 includes the first example golf club shaft 101, an example golf club head 1012, and an example grip 1014. The golf club head 1012 is connected to the first example golf club shaft 101 at the tip end 114. The grip 1014 is connected to the first example golf club shaft 101 at the butt end 115. In some embodiments, the golf club head 1012 is 3D printed in conjunction, and thus integral, with the first example golf club shaft 101. In some embodiments, the grip 1014 is 3D printed in conjunction, and thus integral, with the first example golf club shaft 101.

With reference to FIG. 36, a second example golf club 1020 includes the second example golf club shaft 301, the example golf club head 1012, and the example grip 1014. The golf club head 1012 is connected to the second example golf club shaft 301 at the tip end 114. The grip 1014 is connected to the second example golf club shaft 301 at the butt end 115. In some embodiments, the golf club head 1012 is 3D printed in conjunction, and thus integral, with the second example golf club shaft 301. In some embodiments, the grip 1014 is 3D printed in conjunction, and thus integral, with the second example golf club shaft 301.

With reference to FIG. 37, a third example golf club 1030 includes the third example golf club shaft 401, the example golf club head 1012, and the example grip 1014. The golf club head 1012 is connected to the third example golf club shaft 401 at the tip end 114. The grip 1014 is connected to the third example golf club shaft 401 at the butt end 115. In some embodiments, the golf club head 1012 is 3D printed in conjunction, and thus integral, with the third example golf club shaft 401. In some embodiments, the grip 1014 is 3D printed in conjunction, and thus integral, with the third example golf club shaft 401.

With reference to FIG. 38, a fourth example golf club 1040 includes the fourth example golf club shaft 501, the example golf club head 1012, and the example grip 1014. The golf club head 1012 is connected to the fourth example golf club shaft 501 at the tip end 114. The grip 1014 is connected to the fourth example golf club shaft 501 at the butt end 115. In some embodiments, the golf club head 1012 is 3D printed in conjunction, and thus integral, with the fourth example golf club shaft 501. In some embodiments, the grip 1014 is 3D printed in conjunction, and thus integral, with the fourth example golf club shaft 501.

With reference to FIG. 39, a fifth example golf club 1050 includes the fifth example golf club shaft 701, the example golf club head 1012, and the example grip 1014. The golf club head 1012 is connected to the fifth example golf club shaft 701 at the tip end 114. The grip 1014 is connected to the fifth example golf club shaft 701 at the butt end 115. In some embodiments, the golf club head 1012 is 3D printed in conjunction, and thus integral, with the fifth example golf club shaft 701. In some embodiments, the grip 1014 is 3D printed in conjunction, and thus integral, with the fifth example golf club shaft 701.

With reference to FIG. 40, a sixth example golf club 1060 includes the sixth example golf club shaft 801, the example golf club head 1012, and the example grip 1014. The golf club head 1012 is connected to the sixth example golf club shaft 801 at the tip end 114. The grip 1014 is connected to the sixth example golf club shaft 801 at the butt end 115. In some embodiments, the golf club head 1012 is 3D printed in conjunction, and thus integral, with the sixth example golf club shaft 801. In some embodiments, the grip 1014 is 3D printed in conjunction, and thus integral, with the sixth example golf club shaft 801.

With reference to FIG. 41, a seventh example golf club 1070 includes the seventh example golf club shaft 901, the example golf club head 1012, and the example grip 1014. The golf club head 1012 is connected to the seventh example golf club shaft 901 at the tip end 114. The grip 1014 is connected to the seventh example golf club shaft 901 at the butt end 115. In some embodiments, the golf club head 1012 is 3D printed in conjunction, and thus integral, with the seventh example golf club shaft 901. In some embodiments, the grip 1014 is 3D printed in conjunction, and thus integral, with the seventh example golf club shaft 901. However, in some embodiments, the grip 1014 is a grip as known in the art.

Figures 42, 43:
FIG. 42 is an isometric view of a golf club shaft in accordance with the present disclosure.
FIG. 43 is another isometric, detail view of a portion of the golf club shaft of FIG. 42 shown below plane 43-43.

Referring now to FIGS. 42-57, various single bend putter shafts made in accordance with the present disclosure and supporting data are illustrated, with FIGS. 42-45 illustrating a putter shaft that is 3D printed but does not include any lattice structure. While the embodiments described below include only single bend putter shafts, it is contemplated that the putter shafts described below may include double bend putter shafts. Any of the lattice structures described above with respect to FIGS. 1-41 may be implemented with the putter shafts described hereinafter below. Referring to FIGS. 42 and 43, a single bend putter shaft 1100 is illustrated in detail, which may be manufactured by any of the additive manufacturing methods disclosed herein. The putter shaft 1100 defines a body 1102, which includes an upper portion 1104 and a lower portion 1106. In the present embodiment, the upper portion 1104 and the lower portion 1106 are integral with one another, but in some embodiments, the upper portion 1104 and the lower portion 1106 may be separate components that are coupled with one another. The upper portion 1104 extends downward from a top end 1108, and the lower portion 1106 extends upward from a bottom end 1110 of the body 1102. The body 1102 may also include a lattice structure as discussed hereinafter below.

Referring to FIG. 42, the body 1102 defines a continuous sidewall 1114 that extends between the top end 1108 and the bottom end 1110. The putter shaft 1100 comprises any of the materials described above, and is formed through one or more of the additive manufacturing techniques described above. Referring to FIG. 43, the lower portion 1106 and the bottom end 1110 of the putter shaft 1100 are shown in detail, and the lower portion 1106 defines a bent region 1116 of the putter shaft 1100. For purposes of data collection and comparison, a straightened version of the lower portion 1106 was used for various comparative calculations, as referenced in the tables below, along with straightened versions of various prior art putter shafts. An uninterrupted volume extends an entire length of the body 1102.

Figures 44, 45, 46, 47:
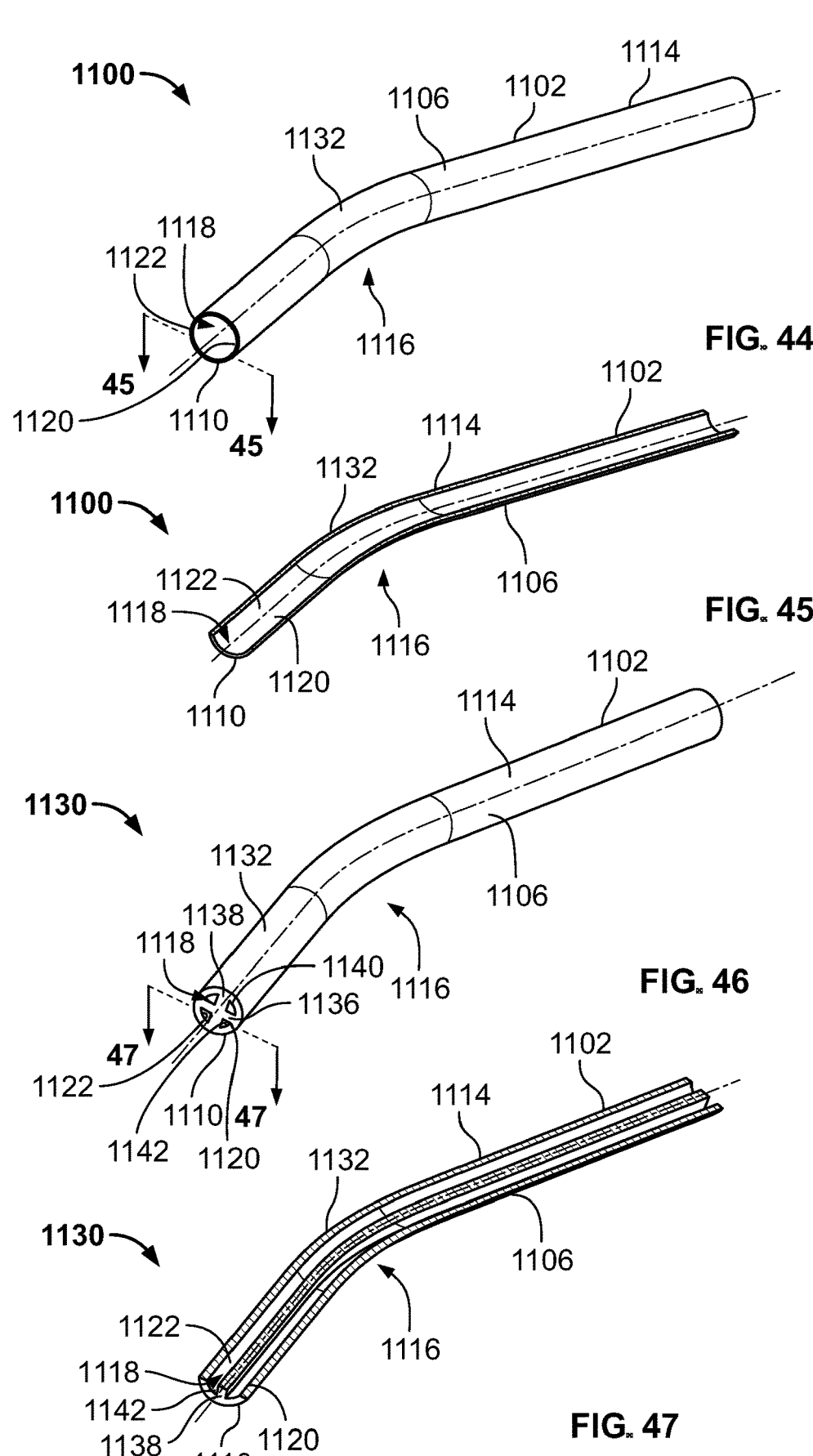
FIG. 44 is another isometric, detail view of the portion of the golf club shaft of FIG. 43.
FIG. 45 is a cross-sectional view of the golf club shaft taken through line 45-45 of FIG. 44.
FIG. 46 is an isometric, detail view of a portion of another golf club shaft in accordance with the present disclosure.
FIG. 47 is a cross-sectional view of the golf club shaft taken through line 47-47 of FIG. 46.

Referring now to FIG. 44, another isometric, detail view of the lower portion 1106 of the putter shaft 1100 is shown, while FIG. 45 is a cross-sectional view of the lower portion 1106 taken through line 45-45 of FIG. 44. As shown in FIG. 45, an interior volume 1118 of the putter shaft 1100 is hollow and defines an uninterrupted volume from a first interior side 1120 to a second interior side 1122 thereof. The putter shaft 1100 can be made of carbon fiber, graphite, steel, or another known material that is capable of being 3D printed. A linear central axis A extends along a geometric center of the putter shaft 1100. As noted above, rolling carbon fiber around a bent mandrel is difficult for both the rolling as well as the mandrel extraction. As a result, traditional bent putter shafts are generally made from steel that can be manufactured into a linear shaft, and subsequently bent to a defined specification. For the purpose of calculating relative mass and stiffness, a 6-inch long straight section of each various material was used analyzed and various measurements were taken. These measurements are reflected in Tables 1-4 below.

Referring now to FIG. 46, the lower portion 1106 of a putter shaft 1130 is shown in accordance with the present disclosure, which defines an outer profile that has an outer surface 1132 and visual profile that is identical or substantially similar to the lower portion 1106 of the putter shaft 1100 of FIGS. 42-45. The putter shaft 1100 and the putter shaft 1130 are identical in all material respect except for the inclusion of lattice structures within the putter shaft 1130. The putter shaft 1130 may be made in whole or in part by components that are 3D printed and may comprise any of the materials listed above in connection with the previously-described embodiments, including carbon fiber, steel, nylon, or a combination of materials within different portions of the components.

However, at least a portion or an entirety of the putter shaft 1130 is formed through additive manufacturing and includes a plurality of lattice elements that extend from the sidewall 1114 of the body 1102 of the putter shaft 1130, and through the central axis A of the putter shaft 1130. The central axis A of the putter shaft 1130 follows the profile of the bent putter shaft and is defined at the geometric center point along a length of the putter shaft 1130. The bent region 1116 may be bent by more than 1 degree, or more than 2 degrees, or more than 3 degrees, or more than 5 degrees, or more than 6 degrees, or more than 7 degrees, or more than 8 degrees, or more than 9 degrees with respect to the portion of the axis A that extends through the upper portion 1104 of the putter shaft 1130. In some embodiments, the bent region 1116 is bent by between 1 degree and 10 degrees, or between 2 degrees and 9 degrees, or between 3 degrees and 8 degrees, or between 4 degrees and 7 degrees.

To that end, since the putter shaft 1130 includes at least a first bend in the bent region 1116, the axis A is not linear, and instead follows a profile of the putter shaft 1130 and is defined along a geometric center of the putter shaft 1130 from the bottom end 1110 to the top end 1108 thereof. The putter shaft 1130 includes a first lattice structure 1136 and a second lattice structure 1138, which are orthogonally offset from one another, and each extend through the central axis A of the putter shaft 1130. The first lattice structure 1136 extends from the first interior side 1120 and the second interior side 1122, while the second lattice structure 1138 extends from a third interior side 1140 and a fourth interior side 1142. The first, second, third, and fourth interior sides 1120, 1122, 1140, 1142 of the putter shaft 1130 are orthogonally offset from one another and define 90 degree radial increments about the central axis A. An uninterrupted volume extends an entire length of the body 1102 between the lattice structures 1136, 1138.

FIG. 47 is a cross-sectional view of the golf club shaft taken through line 47-47 of FIG. 46, which illustrates the second lattice structure 1138 following the profile of the central axis A along the bend of the putter shaft 1130. As shown in FIG. 47, the second lattice structure 1138 is integral with the sidewall 1114 of the putter shaft 1100, and extends inward, toward the central axis A. In the illustrated embodiment, the interior volume 1118 of the putter shaft 1130 is separated into four distinct regions, which are separated by the first lattice structure 1136 and the second lattice structure 1138. As provided in the embodiments of FIGS. 1-41, more or fewer regions of the interior volume

1118 may be provided, which may be separated by additional lattice structures (not shown). Still further, the lattice structure(s) need not be integral along an entire length of the longitudinal axis A, and in some embodiments gaps or apertures may be provided between or along the lattice structure(s). In some embodiments, the interior volume may be filled with another material (not shown), such as a polymer or a foam. The lattice structures 1136, 1138 are at least partially surrounded by the interior volume 1118.

Referring now to FIG. 48, a graph is provided, which illustrates various ratios of torsional stiffness compared with a mass of various golf club shafts. Three prior art shafts were measured, i.e., LAGP Putter Shaft, Yarnway Straight Graphite Shaft, and FST Single Bend Steel, while the remaining shafts implement one or more of the concepts described herein related to shafts formed through additive manufacturing. To that end, BH-r005, BH-r004, BH-r003a, BH-r00b, RR X Marks the Spot, and RR-British Flag, are all formed from carbon fiber and through additive manufacturing. As noted above, the data reflected in FIG. 48 (and Tables 1 and 2 below) was gathered through measurements of various 6-inch, straight sections of various club shafts for the purpose of calculating relative mass and stiffness for illustration of how examples of the concepts disclosed herein improve shaft performance. Straight sections of the various shafts were used for data collection since a curved section of the concepts disclosed herein would be compared to a curved section of a prior art shaft, with the curve profile being the same.

For each of the shafts referenced in FIG. 48 (and Tables 1 and 2), Equation 3 was used to measure torsional stiffness, as shown below, where $\theta$ is the angle of twist in radians, T is the applied torque, G is the Modulus of Rigidity, J is the polar moment of inertia, and L is the length of the shaft:

$$\frac{T}{\theta} = \frac{GJ}{L} \qquad \text{Equation 3}$$

To measure the torsional stiffness of a hollow circular shaft, the torsion constant is a geometrical property of a bar's cross-section which is involved in the relationship between angle of twist and applied torque along the axis of the bar, for a homogeneous linear-elastic bar. The torsion constant, together with material properties and length, describes a bar's torsional stiffness. Equation 4 below is applicable for hollow circular shaft with an outside diameter of $d_o$ and an inside diameter $d_i$:

$$J = \frac{\pi}{32} \times \left(d_o^4 - d_i^4\right) \qquad \text{Equation 4}$$

As a result, torsional stiffness of the hollow shaft is:

$$\frac{GJ}{L} = \frac{G}{L} \times \left[\frac{\pi}{32} \times \left(d_o^4 - d_i^4\right)\right] \qquad \text{Equation 5}$$

The Modulus of Rigidity (aka Shear Modulus) was determined based on material type and layup orientation. For purposes of the torsional stiffness calculations, an approximation that takes into account plies at 0° and +/−45° was used. The Modulus of Rigidity, was obtained from Performance Composites™, and the modulus of rigidity can vary from 5 GPa at 0° to 47 GPa at ±45° for high modulus (HM) carbon fiber.

TABLE 1

| Model | LAGP Putter | Yarnway Graphite | DC CAD | BH-r005 | BH-r004 |
|---|---|---|---|---|---|
| Tip OD (cm) | 0.94 | 0.94 | 0.94 | 0.94 | 0.94 |
| Tip ID (cm) | 0.36 | 0.38 | 0.85 | n/a | n/a |
| Material | Carbon fiber | Carbon fiber | Steel | Carbon fiber | Carbon fiber |
| Volume (cm³) | 9.06 | 8.84 | 1.89 | 7.84 | 7.09 |
| Density (g/cm³) | 1.75 | 1.75 | 7.83 | 1.75 | 1.75 |
| Mass (g) | 15.9 | 15.5 | 14.8 | 13.7 | 12.4 |
| Polar MOI (cm⁴) | 0.075014827 | 0.074537559 | 0.024917742 | 0.048369806 | 0.04798183 |
| Modulus of Rigidity (N/cm²) | 0.0047 | 0.0047 | 0.0077 | 0.0025 | 00025 |
| Length of Shaft (cm) | 2.36 | 2.36 | 2.36 | 2.36 | 2.36 |
| Torsional Stiffness (N*cm/rad) | 1.49E−04 | 1.49E−04 | 8.29E−05 | 5.12E−05 | 5.08E−05 |

TABLE 2

| Model | BH-r003a | BH-r003b | RR X marks spot | RR British Flag |
|---|---|---|---|---|
| Tip OD (cm) | 0.94 | 0.94 | 0.94 | 0.94 |
| Tip ID (cm) | n/a | n/a | n/a | n/a |
| Material | Carbon fiber | Carbon fiber | Carbon fiber | Carbon fiber |
| Volume (cm³) | 6.2 | 6.94 | 6.14 | 7.8 |
| Density (g/cm³) | 1.75 | 1.75 | 1.75 | 1.75 |
| Mass (g) | 10.9 | 12.1 | 10.7 | 13.7 |
| Polar MOI (cm⁴) | 0.060521997 | 0.06402112 | 0.054148018 | 0.060662766 |
| Modulus of Rigidity (N/cm²) | 0.0025 | 0.0025 | 0.0025 | 0.0025 |

TABLE 2-continued

| Model | BH-r003a | BH-r003b | RR X marks spot | RR British Flag |
|---|---|---|---|---|
| Length of Shaft (cm) | 2.36 | 2.36 | 2.36 | 2.36 |
| Torsional Stiffness (N*cm/rad) | 6.41E−05 | 6.78E−05 | 5.74E−05 | 6.42E−05 |

Referring to the data in Tables 1 and 2 above, a comparison of the torsional stiffness and the mass of each the various measured club shafts is shown graphically in FIG. 48. As illustrated in the graph of FIG. 48, the shafts highlighted with arrows (BH-r003a, BH-r003b, and RR X Marks the Spot) display more or similar stiffness per unit mass than existing, prior art shafts. While the shafts that are highlighted with arrows do not have as high of a stiffness or mass as the prior art graphite shafts, i.e., the LAGP Putter Shaft and the Yarnway Straight Graphite Shaft, the prior art graphite shafts cannot be made into bent shaft sections due to the manufacturing techniques required to make such shafts. However, and importantly, the highlighted shafts have a reduced overall weight for the comparative, 6-inch section length. As a result, having a lower weight allows for targeted redistribution of mass in certain regions of the club, which can be modified or adjusted based on one or more desired performance characteristics of the golf club.

Referring now to FIG. 49 (and Tables 3 and 4), another graph is shown illustrating various ratios of torsional stiffness compared with mass of various golf club shafts. In the graph of FIG. 49, the shear modulus is made the same across each of the putters of the same material, i.e., across all of the composite shafts. With an adjusted, constant shear modulus across the shafts of the same material, the graph of FIG. 49 highlights that BH-r003a, BH-r003b, and RR X Marks the Spot have the highest ratio of torsional stiffness to mass among the various club shaft portions.

TABLE 3

| Model | LAGP Putter | Yarnway Graphite | FST Single Bend | BH-r005 | BH-r004 |
|---|---|---|---|---|---|
| Tip OD (cm) | 0.94 | 0.94 | 0.94 | 0.94 | 0.94 |
| Tip ID (cm) | 0.36 | 0.38 | 0.83 | n/a | n/a |
| Material | Carbon fiber | Carbon fiber | Steel | Carbon fiber | Carbon fiber |
| Volume (cm$^3$) | 9.06 | 8.84 | 1.89 | 7.84 | 7.09 |
| Density (g/cm$^3$) | 1.75 | 1.75 | 7.83 | 1.75 | 1.75 |
| Mass (g) | 15.9 | 15.5 | 14.8 | 13.7 | 12.4 |
| Polar MOI (cm$^4$) | 0.075014827 | 0.074537559 | 0.024917742 | 0.048369806 | 0.04798183 |
| Modulus of Rigidity (N/cm$^2$) | 0.0047 | 0.0047 | 0.0077 | 0.0047 | 00025 |
| Length of Shaft (cm) | 2.36 | 2.36 | 2.36 | 2.36 | 2.36 |
| Torsional Stiffness (N*cm/rad) | 1.49E−04 | 1.49E−04 | 9.80E−05 | 9.60E−05 | 9.60E−05 |
| Torsional Stiffness/Mass | 9.42E−06 | 9.60E−06 | 6.63E−06 | 7.02E−06 | 7.70E−06 |

TABLE 4

| Model | BH-r003a | BH-r003b | RR X marks spot | RR British Flag |
|---|---|---|---|---|
| Tip OD (cm) | 0.94 | 0.94 | 0.94 | 0.94 |
| Tip ID (cm) | n/a | n/a | n/a | n/a |
| Material | Carbon fiber | Carbon fiber | Carbon fiber | Carbon fiber |
| Volume (cm$^3$) | 6.2 | 6.94 | 6.14 | 7.8 |
| Density (g/cm$^3$) | 1.75 | 1.75 | 1.75 | 1.75 |
| Mass (g) | 10.9 | 12.1 | 10.7 | 13.7 |
| Polar MOI (cm$^4$) | 0.060521997 | 0.06402112 | 0.054148018 | 0.060662766 |
| Modulus of Rigidity (N/cm$^2$) | 0.0047 | 0.0025 | 0.0025 | 0.0025 |
| Length of Shaft (cm) | 2.36 | 2.36 | 2.36 | 2.36 |
| Torsional Stiffness (N*cm/rad) | 1.21E−04 | 1.27E−04 | 1.08E−04 | 1.21E−042 |
| Torsional Stiffness/Mass | 1.11E−05 | 1.05E−05 | 1.00E−05 | 8.85E−06 |

Referring now to FIG. 50, a plot is shown of the ratios of FIG. 49, which illustrates a comparison of the torsional stiffness compared against a mass of the various shafts, with the shear modulus being made constant across each of the putter shafts of the same material. As shown in the graph, the shafts made through additive manufacturing techniques, e.g., 3D printing, are shown within a circle 1150. The FST Single Bend (steel shaft) is shown on the graph slightly outside of the circle 1150, while the remaining prior art shafts, LAGP Putter and Yarnway Graphite, are shown in the upper right corner of the graph. As noted in the graph, the FST Single Bend shaft has low stiffness, but heavy weight, while the two composite prior art shafts, LAGP Putter and Yarnway Graphite, exhibit high stiffness as well as high weights. As referenced within the circle 1150 that includes all of the shafts formed through additive manufacturing, the stiffness and the weight of such shafts are less dependent upon one another, resulting in more freedom with respect to the shaft design.

For example, the shafts disclosed herein and shown within the circle of the graph of FIG. 50 can be made through any one of the aforementioned additive manufacturing techniques and are able to achieve varying torsional stiffness and mass properties, which may be modified to achieve certain performance characteristics of a particular shaft. In some embodiments, a shaft having higher torsional stiffness, and lower mass may be desired, while in other embodiments a shaft having a lower torsional stiffness and higher mass may be desired. By implementing one or more of the lattice structures described above, the torsional stiffness and mass properties can be modified based on desired performance characteristics of the shaft. Further, the use of 3D printing or another type of additive manufacturing technique to manufacture the shafts disclosed herein can provide for topology optimization that can create undercut geometry that can only be made via additive manufacturing.

Referring now to FIG. 51, a graph is shown that illustrates the importance of torsional stiffness in a putter shaft. A stiffer shaft, especially down at the section near the head, i.e., at or along the lower portion 1106, can reduce the amount of twist of the head during a putting stroke, resulting in more consistent putt launch conditions and better putts. The graph of FIG. 51 highlights the relative amounts of head rotation during a stroke for a shaft with high torsional stiffness (LE Supersport-35, dash-dash line) versus a shaft with lower torsional stiffness (Stock Anser, solid line). Through representative strokes achieving club head speeds of 3.42 and 3.48 mph, respectively, the shaft with the higher torsional stiffness (dash-dash line) is more stable during the stroke. As a result, having a putter shaft with higher torsional stiffness may be desirable since it can reduce twisting of the shaft, which can result in an undesirable launch angle of the ball. To achieve a higher torsional stiffness in a composite shaft, a higher mass is generally required. However, as noted above, through additive manufacturing the torsional stiffness and mass can be modified or adjusted based on desired performance characteristics of the club head.

As noted above, most putter shafts are rolled onto a mandrel, cured, and then mandrel removed. Referring now to FIGS. 52-55, an embodiment of a 3D printed portion 1152 of the putter shaft 1130 that includes multiple components that are coupled together during manufacturing. In particular, the 3D printed portion 1152 is the lower portion 1106 of the putter shaft 1130, and the upper portion 1104 is a prior art shaft portion that may be made through any number of well-known manufacturing techniques. To that end, the 3D printed portion 1152 is manufactured, and subsequently attached to a tip end of the mandrel such that when rolled, the 3D printed portion 1152 acts like the very most tip portion of the mandrel. Once the upper portion 1104 is formed about the mandrel and after curing, the mandrel can be removed, i.e., through the butt end of shaft) but the lattice section stays in place as it ends up being cured in place, in order to significantly increase tip stiffness and torsional stiffness without having to substantially change the type of composite material or layup that would normally be used. Effectively, the mandrel is modified to include the portion 1152, which is integral with the upper portion 1104 after curing.

Still referring to FIGS. 52-55, the putter shaft 1130 is shown having the detachable lower portion 1106, i.e., the 3D printed portion 1152. As noted above, a stiffer shaft, especially near the putter head (not shown) can reduce the amount of twist of the head during a putting stroke, resulting in more consistent putt launch conditions and better putts. In such an embodiment, the upper portion 1104 of the shaft may comprise one or more well-known putter shaft materials and may be formed through any number of well-known manufacturing techniques, while the lower portion 1106 is 3D printed. Referring to FIGS. 52 and 53, the lower portion 1106 is shown, which includes the bottom end 1110, the sidewall 1114 centered about the central axis A, the first lattice structure 1136, and the second lattice structure 1138. Any of the 3D printed structures described above with respect to FIGS. 1-41 may be used within the lower portion 1106. An inset region 1154 is further shown in FIGS. 52 and 53, which is a cylindrical portion that is unitary or integral with the lower portion 1106, but defines a smaller diameter, allowing for coupling to the upper portion 1104. The inset region 1154 may be configured to be coupled with the mandrel during the manufacturing process, as noted above.

Referring to FIG. 54, the lower portion 1106 is shown coupled with the upper portion 1104 to define the putter shaft 1130. FIG. 55 illustrates a cross-section of the putter shaft 1130 taken through line 55-55 of FIG. 54, and illustrates the internal volume 1118 of the putter shaft 1130. As illustrated in FIG. 54, the lower portion 1106 defines an inner diameter 1156 and an outer diameter 1158, and the inset region 1154 defines an outer diameter 1160. In the illustrated embodiment, the inner diameter 1156 of the lower portion 1106 is the same as the inner diameter of the inset region 1154, while the outer diameter 1158 of the lower portion 1106 is larger than the outer diameter 1160 of the inset region 1154, which allows the upper portion 1104 to be coupled thereto. In some embodiments, the inner diameter of the inset region 1154 may be smaller than the inner diameter 1156 of the lower portion 1106.

As discussed above, by using additive manufacturing (3D printing) to manufacture only the bent portion of the shaft out of composite, carbon, or steel, various performance characteristics can be modified to achieve certain mass or torsional stiffness properties. To that end, by 3D printing the lower portion 1106 (the bent portion) of the shaft 1130 allows for increased control over attributes like weight, thickness, bending/torsional stiffness, and cross-sectional area along every point of the component, i.e., along the entire central axis A. In the embodiment of FIGS. 52-55, the upper portion may be rolled onto a mandrel, cured, and then mandrel removed, while the lower portion 1106 is 3d printed, and includes a lattice portion (or portions) only and attached to the tip end of the mandrel such that when rolled, the lattice portion acts like the very most tip portion of the mandrel. Such a shaft 1130 significantly increase tip stiffness and torsional stiffness without having to substantially change the type of composite material or layup that would normally be used. Such a shaft 1130 may also be implemented with respect to straight shafts, and need not be a part of a single or double bend shaft.

Referring now to FIGS. 56 and 57, partial cross-sectional views are shown of lattice structures that may be implemented with any of the shafts described above, i.e., the shaft 1130. A similar lattice structure is shown in each of the figures, with the difference related to additional helical ribs being provided in FIG. 56. Referring in particular to FIG. 56, a plurality of lattice bars 1166 are shown extending from a first helical rib 1168 and a second helical rib 1170, respectively. The lattice bars 1166 are disposed in a helical configuration and include lattice bars or segments 1166 that extend through the central or longitudinal axis A. The sidewall 1114 of the body 1102 of the shaft 1130 surrounds the lattice bars 1166, which are provided at different angles with respect to one another along a length of the longitudinal axis. While a configuration is depicted that illustrates a traditional double helix, alternative configurations are contemplated, which may be based upon desired performance characteristics of the shaft 1130, e.g., torsional stiffness, mass, etc.

FIG. 57 depicts an embodiment that does not include the first helical rib 1168 and the second helical rib 1170. As such, the lattice bars 1166 extend directly from the sidewall 1114 of the shaft 1130. In some embodiments, the first and second helical ribs 1168, 1170 may have alternative structure(s), and/or may be separate components from the sidewall 1114. Referring to both FIGS. 56 and 57, and to provide an example of the embodiment depicted, the uppermost lattice bar 1166 may be provided at position 0 and disposed at angle 0. A distance X downward, e.g., 1 inch, the lattice bar 1166 may be disposed offset from the first lattice bar by an angle of 30, then 60, then 90, etc. (or 0/45/90/135/180/ etc . . . ). The position or location of each of the lattice bars may be unique to a particular golfer, based on desired performance characteristics, so the stiffness bars may be placed at the appropriate or "unique" pattern to create a stiffness profile that is engineered to a more granular level than existing shafts can be manufactured.

To that end, the lattice bars 1166 may include first, second, third, and fourth lattice bars 1166 that are disposed in sequence, moving from a top of the shaft 1100 downward. The first lattice bar that may be disposed at an angle of 0, the second lattice bar may be disposed at an angle of 45, the third lattice bar may be disposed at an angle of 90, the fourth lattice bar may be disposed at an angle of 135, and the fifth lattice bar may be disposed at 180. In such an embodiment, the lattice bars 1166, moving in sequence, are each offset from the previous lattice bar by 45. In some embodiments, the lattice bars 1166, moving in sequence, are each offset from the previous lattice bar by 5, or by 10, or by 15, or by 20, or by 25, or by 30, or by 35, or by 40 about the axis. In some embodiments, the lattice bars 1166, moving in sequence, are each offset form the previous lattice bar by between about 5 and about 50, or between about 15 and about 40, or between about 25 and about 35. In some embodiments, additional structure is included along or extending form the sidewall 1114, which may be provided to enhance one or more performance characteristics of the shaft 1130.

The disclosure provides golf club shafts and methods of making them that involve 3D printing. Embodiments include methods of making golf club shafts that include a lattice structure, and golf club shafts that are least partially 3D printed. Methods herein include designing a shaft in a computer-assisted drawing (CAD) program, e.g., with a lattice structure at any point therein. Parameters like dimensions and material for an outer layer or dimensions, locations, material, and pore structure for a lattice structure inside of the outer layer can be adjusted in the CAD model. The designed shaft may be created using a large-format 3D printer. In some embodiments, a standard sized 3D printer could be used to manufacture or produce the portions or segments of the shafts disclosed above, such that the portions or segments are joined together, e.g., through bonding or another coupling method as described above with respect fo FIGS. 52-55. In some embodiments, additional decals or other known exterior shells may be applied to the 3D printed shafts described herein. Where unlike materials are printed together (e.g., a first material embedded within another, a first material abutting another, a seamless transition from the first material to the second material, etc.), the large-format 3D printer can operate to change input material to form the materials together.

What is claimed is:

1. A golf club shaft, consisting of:
   a 3D printed body defining an outer sidewall that extends from a top to a bottom of the golf club shaft and an axis that extends centrally through the top and the bottom of the golf club shaft, with an inner surface of the 3D printed body defining a first side and a second side that is located opposite the first side,
   wherein an uninterrupted volume extends between the first side and the second side along an entire length of the 3D printed body.

2. The golf club shaft of claim 1, wherein the 3D printed body includes a first lattice structure that extends from the first side to the second side.

3. The golf club shaft of claim 2, wherein the 3D printed body includes a second lattice structure that extends from a third side to a fourth side of the 3D printed body.

4. The golf club shaft of claim 3, wherein the first lattice structure and the second lattice structure are orthogonally offset from one another.

5. The golf club shaft of claim 3, wherein the first lattice structure and the second lattice structure are offset circumferentially about the axis by between 5° and 45°.

6. The golf club shaft of claim 3, wherein the first lattice structure and the second lattice structure are among a plurality of segments that form a helical structure within the 3D printed body.

7. The golf club shaft of claim 1, wherein the 3D printed body defines a lower portion and an upper portion, and the lower portion includes at least one bent region.

8. A portion of a golf club shaft, consisting of:
   a 3D printed body defining a bent region and an axis that extends centrally through a top and bottom of the golf club shaft, with an inner surface of the 3D printed body defining a first side and a second side that is located opposite the first side,
   wherein the 3D printed body includes a first lattice structure and a second lattice structure that each extend though the axis, and
   wherein the 3D printed body has an outer sidewall that extends between and at least partially defines the top and the bottom of the golf club shaft.

9. The portion of the golf club shaft of claim 8, wherein the 3D printed body is a lower portion of the golf club shaft, and
   wherein the 3D printed body is configured to be coupled with an upper portion of the golf club shaft.

10. The portion of a golf club shaft of claim 8, wherein the 3D printed body includes an inset region at an upper end thereof.

11. The portion of a golf club shaft of claim 8, wherein the inset region is configured to be coupled with an upper portion of the golf club shaft.

12. The portion of a golf club shaft of claim 8, wherein the at least one lattice structure extends from the first side to the second side thereof.

13. The portion of a golf club shaft of claim 12, wherein the first lattice structure and the second lattice structure orthogonally intersect.

14. The portion of a golf club shaft of claim 12, wherein the first lattice structure and the second lattice structure extend from a bottom end of the 3D printed body to an upper end of the extended body.

15. A golf club shaft, consisting of:

a 3D printed body having an outer sidewall extending from a top to a bottom of the golf club shaft and defining a bent region and an axis that extends centrally through the top and the bottom of the golf club shaft, with an inner surface of the 3D printed body defining a first side and a second side that is located opposite the first side, wherein an uninterrupted volume extends between the first side and the second side along an entire length of the 3D printed body.

16. The golf club shaft of claim 15, wherein the 3D printed body further includes a first lattice structure and a second lattice structure.

17. The golf club shaft of claim 16, wherein the first lattice structure and the second lattice structure define a helical arrangement of lattice bars.

18. The golf club shaft of claim 16, wherein the first lattice structure and the second lattice structure are offset by between 5° and 45° in a direction that is perpendicular with respect to the axis.

19. The golf club shaft of claim 16, wherein the 3D printed body consists of carbon fiber.

* * * * *